United States Patent
Beaufrand

[19]

[11] Patent Number: 6,148,514
[45] Date of Patent: Nov. 21, 2000

[54] METHOD FOR BUTT-END ELECTROMECHANICAL SPLICING

[76] Inventor: Emmanuel Marie Eugene Beaufrand, Urb. Zapara, Calle 57 #5-42, Maracaibo, Venezuela

[21] Appl. No.: 09/285,344

[22] Filed: Apr. 2, 1999

[51] Int. Cl.[7] .................................................. H01R 43/00
[52] U.S. Cl. .................... 29/869; 29/402.01; 29/402.16; 174/88 R; 219/76.14; 219/76.15
[58] Field of Search .......................... 29/402.01, 402.07, 29/402.09, 402.13, 402.16, 402.18, 825, 868, 869; 219/121, 76.14, 76.15; 174/88 R

[56] References Cited

U.S. PATENT DOCUMENTS

| | | | |
|---|---|---|---|
| 3,259,969 | 7/1966 | Tessmann | 29/487 |
| 3,812,283 | 5/1974 | Kothe et al. | 174/105 R |
| 3,828,601 | 8/1974 | Tessmann | 72/334 |
| 3,934,784 | 1/1976 | Tessmann | 228/125 |
| 3,956,877 | 5/1976 | Gilmore | 57/145 |
| 4,079,189 | 3/1978 | Troccoli | 174/73 |
| 4,317,003 | 2/1982 | Gray | 174/106 |
| 4,367,917 | 1/1983 | Gray | 350/96.23 |
| 4,375,720 | 3/1983 | Bourget | 29/869 |
| 4,407,065 | 10/1983 | Gray | 29/828 |
| 4,408,828 | 10/1983 | Le Noane | 350/96.23 |
| 4,496,795 | 1/1985 | Konnik | 174/84 |
| 4,585,304 | 4/1986 | Winter et al. | 350/96.21 |
| 4,976,796 | 12/1990 | Feitzelmayer | 156/49 |
| 5,126,527 | 6/1992 | Haehner | 219/85.15 |
| 5,170,034 | 12/1992 | Seshimo et al. | 219/125.1 |
| 5,537,742 | 7/1996 | Le et al. | 29/869 |
| 5,638,471 | 6/1997 | Semo et al. | 385/33 |
| 5,914,055 | 6/1999 | Roberts et al. | 219/76.15 |

*Primary Examiner*—Carl J. Arbes
*Attorney, Agent, or Firm*—Brian S. Steinberger; Law Offices of Brian S. Steinberger

[57] ABSTRACT

A process and system for repairing electromechanical cables having an external armor wire layer using a butt welding technique and an arc vanishing machine. A short (break) in a cable having both an external and inner helically wrapped wire layer over an inner conductor(s) is located using conventional techniques. After the inner conductor(s) and inner wrapped layer are repaired (i.e., spliced), the outer wire layers are reconnected using a butt-end welding process and form individual arc shapes. The cable automatically passes through dies on headers to vanish (displace) each of the arcs to the end of the cable. A safety system activates an alarm to shut down the system when a jam occurs before any cable wires break. The system is reactivated after the jam is cleared.

13 Claims, 33 Drawing Sheets

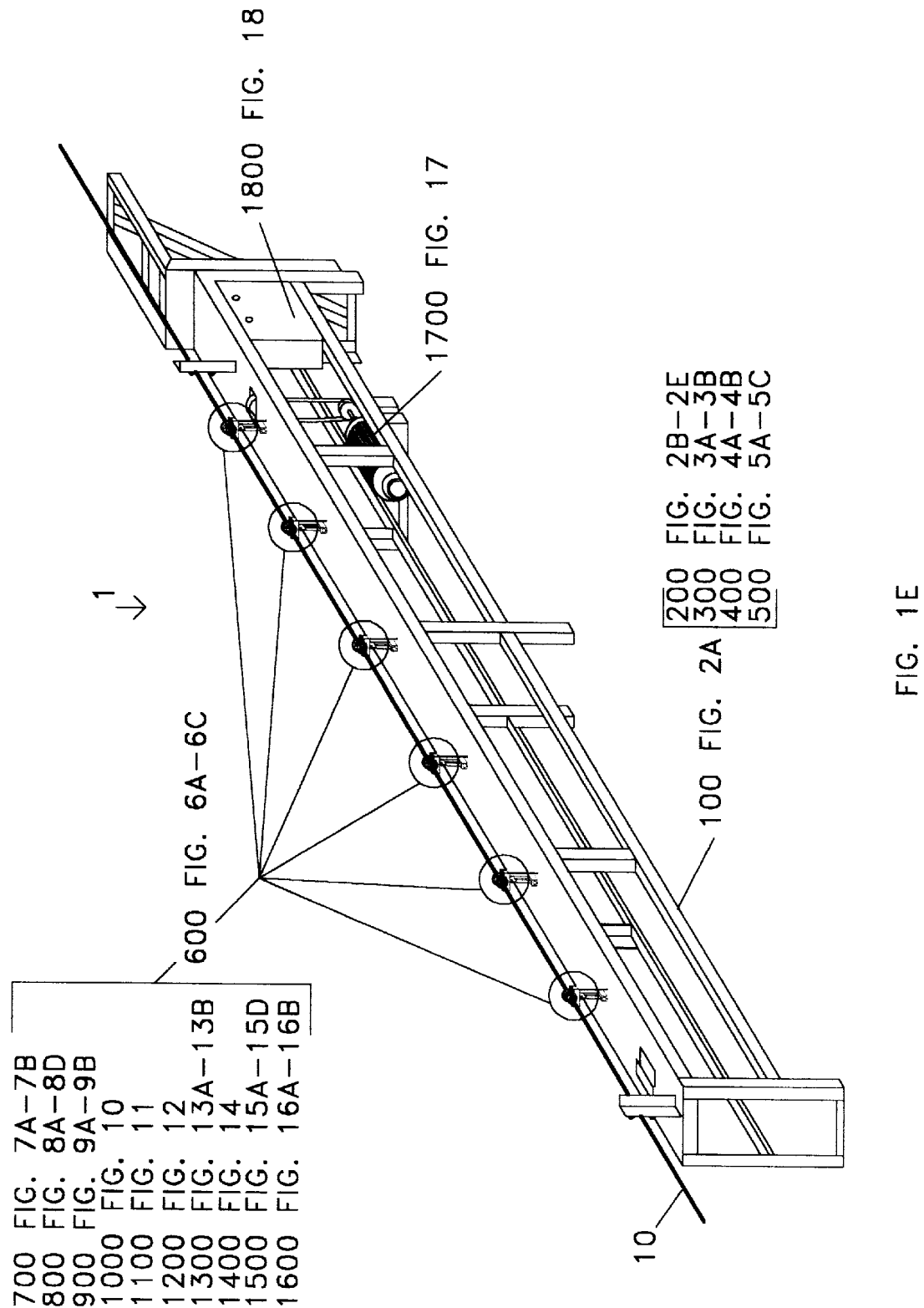

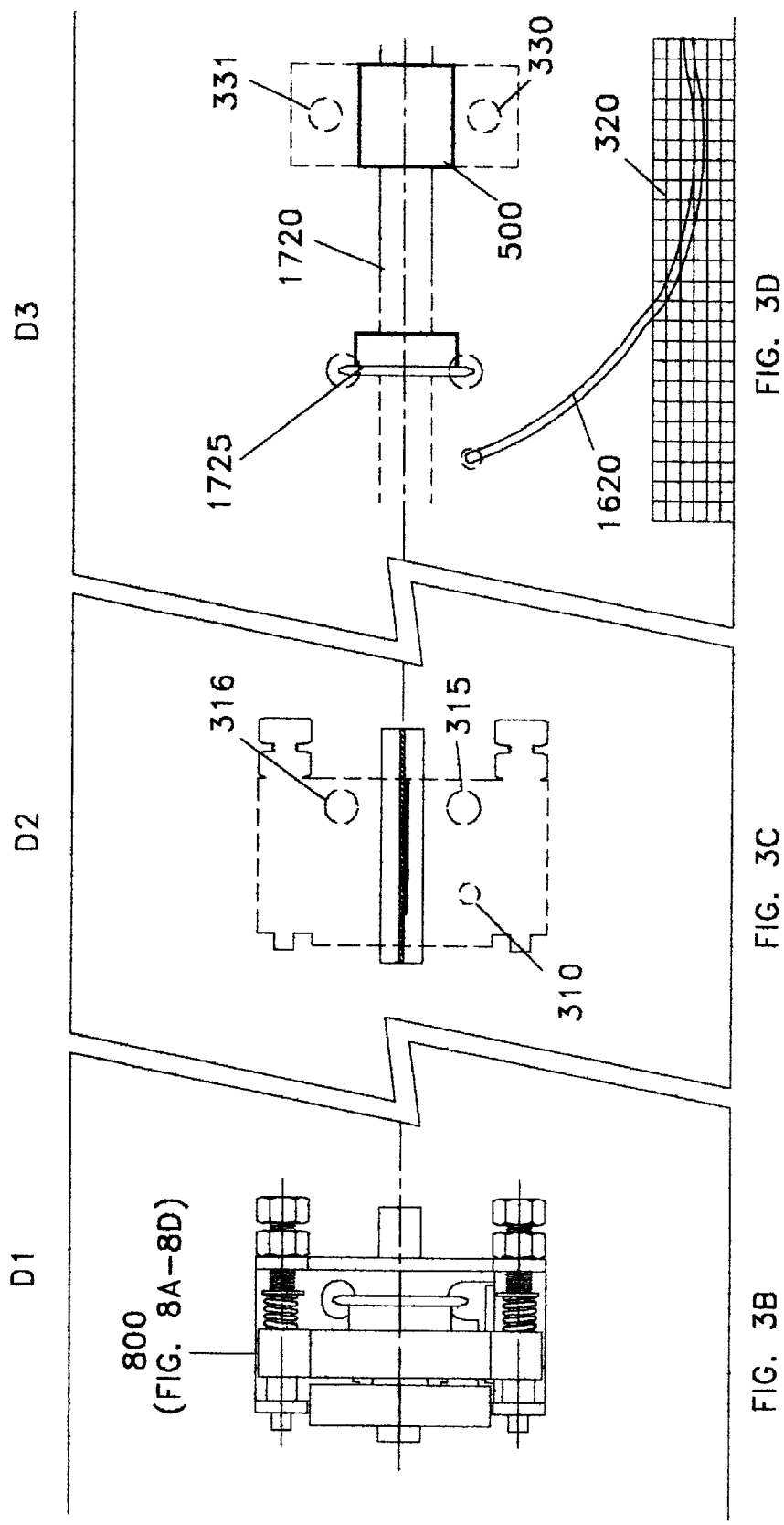

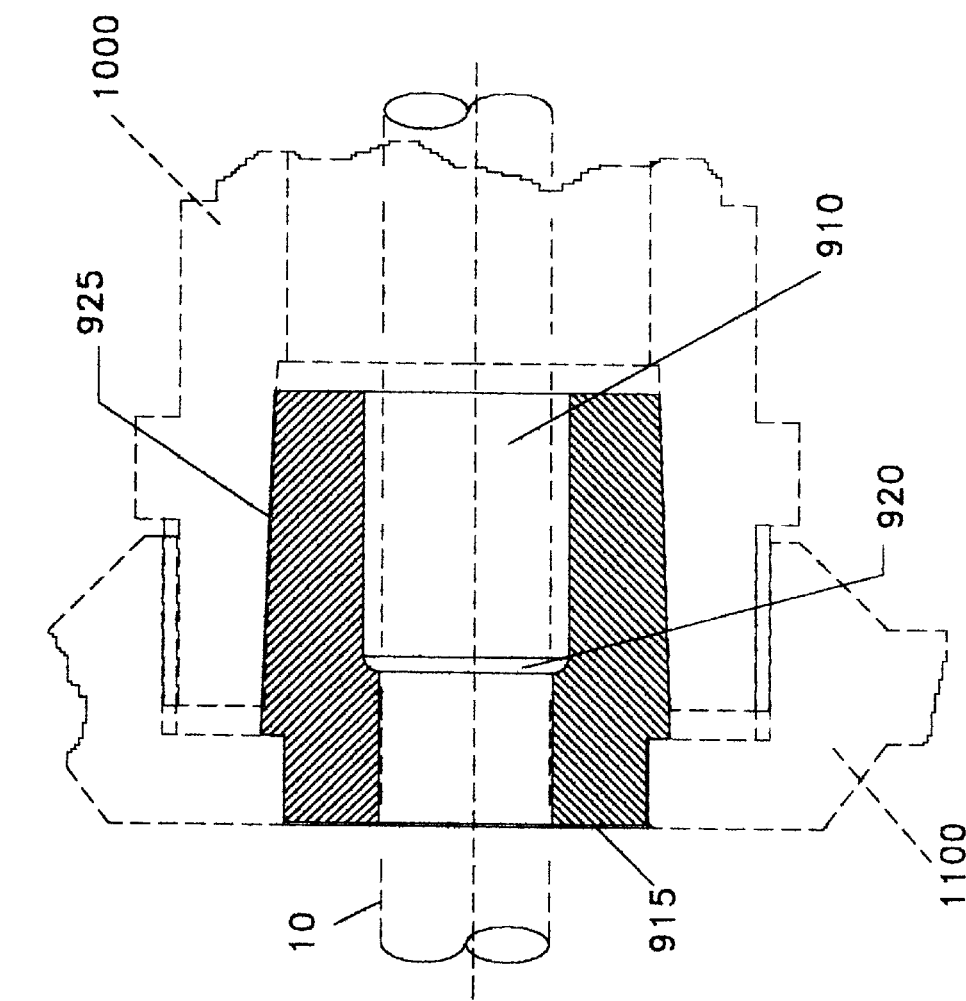
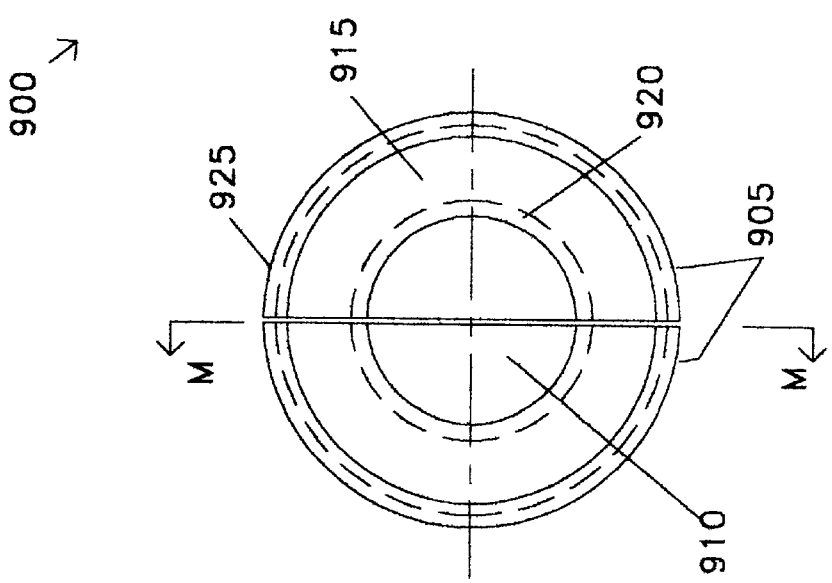
FIG. 9B
FIG. 9A

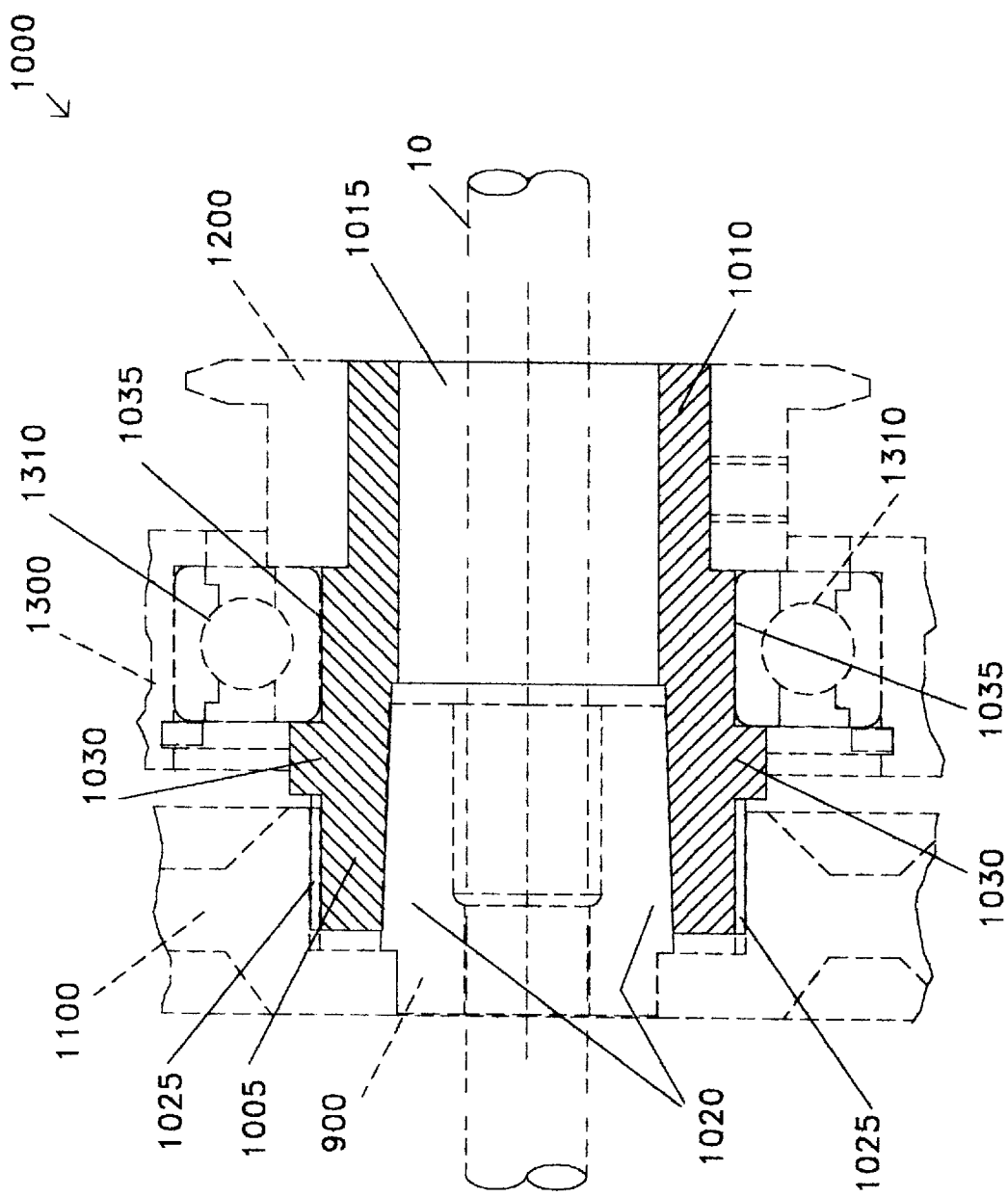

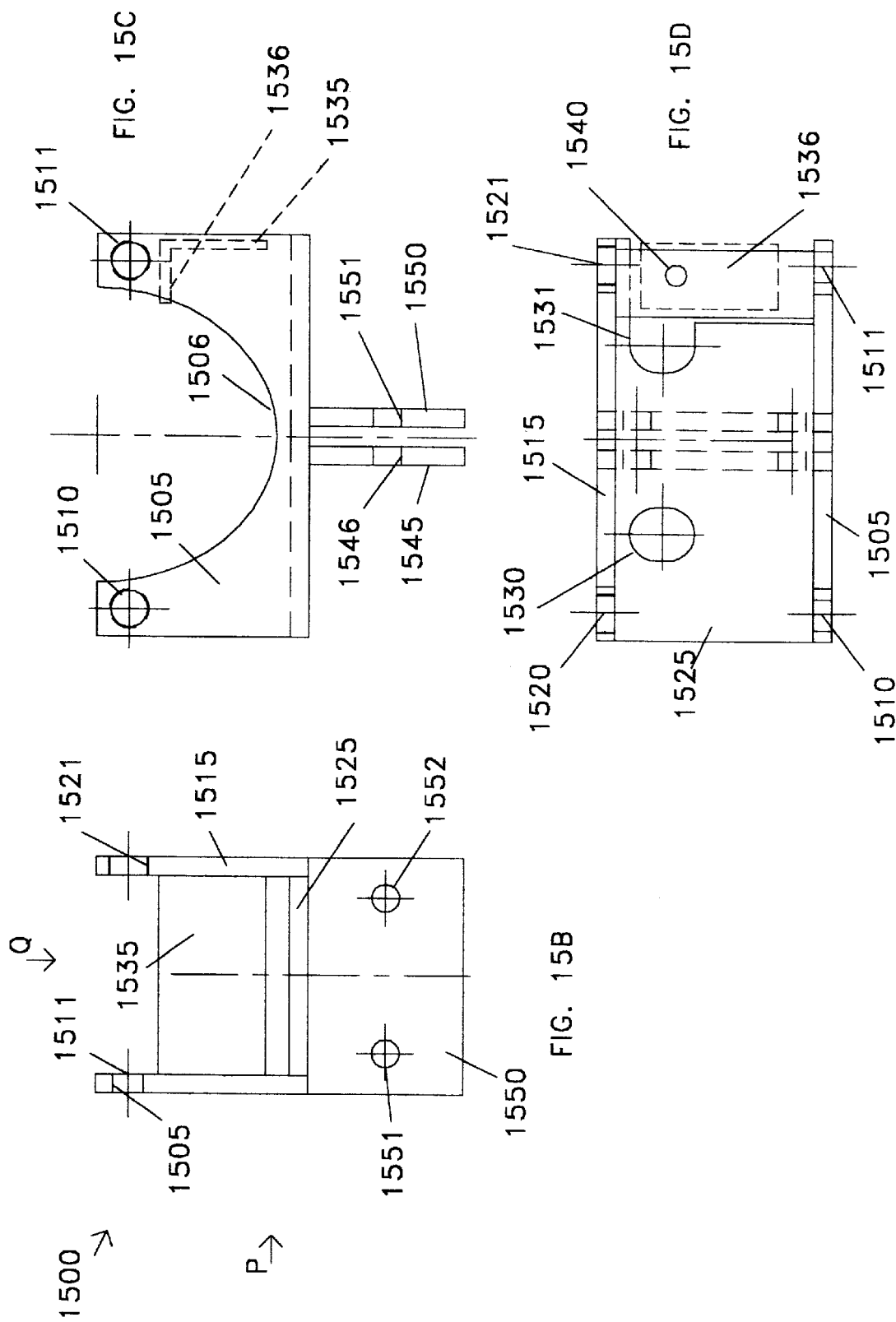

METHOD FOR BUTT-END ELECTROMECHANICAL SPLICING

This invention relates to cables and in particular to a method of splicing electromechanical cables using a novel cable splicing technique of butt end welding and subsequent displacement of the wires conforming the outer armor of the cable with a machine designed for this purpose.

BACKGROUND AND PRIOR ART

Traditional electromechanical cables are comprised of a core containing one or more insulated electric conductors and covered by two layers of helical pattern oppositely wound steel armor wires. Typically, the inner layer of wires in contact with the insulation material is wrapped in a right-hand lay. The outer layer of wires, to overcome the tendency of the cable itself to rotate, is wrapped over the inner layer in a left-hand lay pattern. These cables are used in the oil exploration industry for detonating explosives to "open" a field and in well logging operations. Over time, because of wear, corrosion, bending, fatigue, torque, rotation, physical damage, etc., these cables present loose armor, gaps in armor, broken armor wires, electrical leakage or break down, etc., and are required to be repaired. Therefore, electromechanical cables are frequently spliced.

For example, traditional methods of splicing a double-armored cable presenting an electrical break down include approximately six steps. The first step is to locate the short circuit spot in the cable using a traditional process of determining the resistance at whip end, at drum end and of the line with a battery and a digital voltmeter, then applying a formula to determine the distance from one cable end to the shortcut. The second step is to cut the cable at the short circuit spot. The third step is to reestablish the conductivity at the spot. The fourth step is to reestablish the insulation over the electrical conductor(s). The fifth step is to resplice the inner metallic armor. The sixth step is to splice and fasten the outer armor wires together.

The first five steps are commonly done to most repair methods. The splicing of the outer armor layer referenced in the sixth step has usually been accomplished by two different techniques, one referred to as silver brazing and the other one as "shiming" with metal foils (brazed splice or "shimed" splice).

The silver-braze technique uses an oxi-acetelene torch or equivalent machine to weld the adjacent outer wires to one another in order to avoid their unwinding. Although the silver brazing technique assures the tips of the cut wires will stay in place, it has several problems caused by the welding spots. These spots affect the mechanical conditions of the cable since the brazed wires at their welding points are rigid, thus not movable. These rigid and non-bendable spots increase the friction of the cable within logging holes, which accelerates the wear and tear of the cable itself. Furthermore, the welding spots produce lumps that increase the diameter of the cable making it impossible to reuse it in cased hole operations since the lumps can cause the cable to get stuck in the pipe.

The technique of "shiming" with metal holding foils uses stainless steel foils to hold together the adjacent cut wire ends in order to stop their unwinding. Typically the cut wire ends are pressed together between a stainless steel foil and the inner metallic wound armor of the cable, and then the foil ends are inserted between the inner and outer armor wires of the cable. Although the shiming technique allows the spliced wires to retain their individual flexibility, this technique also has serious drawbacks. For example, cables having the foil repair cannot be used in cased hole operations since typical high-pressure flow from the well would displace the foils exposing and allowing the tip ends of the cut wire to separate.

Many U.S. patents have been proposed to resplice together cut cables. See for example U.S. Pat. Nos. 3,259,969 and 3,828,601 and 3,934,784 to Tessman; U.S. Pat. No. 3,956,877 to Gilmore; U.S. Pat. No. 4,079,189 to Troccoli; U.S. Pat. Nos. 4,317,003 and 4,367,917 and 4,407,065 to Gray; U.S. Pat. No. 4,408,828 to Le Noane et al. U.S. Pat. No. 4,496,795 to Konnik; U.S. Pat. No. 4,585,304 to Winter et al. However, none of the patents overcome all the problems mentioned above.

SUMMARY OF THE INVENTION

The first objective of the present invention is to provide a method of repairing and splicing electromechanical cables that allows the spliced wire ends to retain flexibility and mobility.

The second object of this invention is to provide a method of repairing and splicing electromechanical cables that eliminates welding spot lumps at the spliced wire ends.

The third object of this invention is to provide a method of repairing and splicing electromechanical cables that eliminates the risk of exposure of spliced wire ends.

The fourth object of this invention is to provide a method of repairing and splicing electromechanical cables that allows repaired cables to be used in flow control pipes.

The fifth object of this invention is to provide a method of repairing and splicing electromechanical cables that allows the repaired cables to be used in high pressure cased hole operations.

The sixth object of this invention is to provide a novel electromechanical cable splicing process and a machine for carrying out this process.

The butt-end welding of two single wire tips allows obtaining a spliced wire whose original characteristics are basically unchanged. It would stand out as the ideal technique for splicing the outer armor wires of the electromechanical cable. Nevertheless, since butt-end welding applied to the outer armor wires binds the formation of arcs approximately one foot high at each wire splicing point which alters the original configuration of the electromechanical cable, this technique has not been used.

The invention includes a novel method and system, the Butt-End Welding and Arch Vanishing Cable Splicing System, of splicing electromechanical cables by butt-end welding of the outer armor wires and subsequent vanishing of the resulting arcs.

The invention includes a novel machine, the Arc Vanishing Machine (AVM), that makes this splicing procedure feasible by resetting the cable configuration through all its length.

Spliced cable using this process maintains its original characteristics and does not suffer any deformation that could restrain its use. Therefore, after being spliced, repaired cables can be reinstalled in cased hole logging operations, flow control pipes, pressure control systems in producing wells, high pressure cased hole operations as geothermal wells, steam injection wells, and the like, which represents an increased service life of the cable.

The novel splicing process includes:
 (i) Butt-end welding the cut-off wires using a commercial electric Butt-End Microwelder.

(ii) Resetting the external armor of the cable by displacement of the butt-end welding resulting arcs until their disappearance at one of the ends of the cable using the Arc Vanishing Machine (proper setup of a commercial spooling equipment providing the movement of the cable through the Arc Vanishing Machine being a pre-requisite of the machine to operate).

(iii) Post-forming the spliced cable to guarantee the effectiveness of the welding and to withdraw stress from the wires using a commercial Postformer.

The novel Arc Vanishing Machine (AVM) includes:

(i) A framework supported table with six turrets placed on its surface (it could be 9, 12, etc.). Each turret has a former head on top.

(ii) The former heads represent the heart of the AVM. Each contains die, die-box, adjusting nut and chain sprocket which rotate as a whole by the action of the rotary system of the machine and conform its spinning assembly.

(iii) This spinning assembly and the bearing box that houses it are kept in working position by the action of the two base spacers. Its adjustable springs present more or less pressure to keep this mobile assembly in place.

(iv) Dies rotation combined with the friction they exert on the arcs as the cable is spooled reaccommodates the wires following their original helical wave paths, displacing the arcs until their vanishing at the cable end.

(v) Eventually, if displaced by the force applied on the die by the friction of the cable, the mobile assembly activates the security sensor provided in the electric system control panel to avoid eventual break of the wires. It generates the stop of the AVM rotary system and of the spooling equipment rewinding.

Further objects and advantages of this invention will be apparent from the following detailed description of the operation process and of a presently preferred embodiment, which are illustrated schematically in the accompanying drawings.

BRIEF DESCRIPTION OF THE FIGURES

FIG. 1E is a perspective view of the novel Arc Vanishing Machine 1 of FIG. 1A showing its major groups of components.

FIG. 3B is a top view of a section of FIG. 3A along arrow D1.

FIG. 3C is a top view of another section of FIG. 3A along arrow D2.

FIG. 3D is a top view of another section of FIG. 3A along arrow D3.

FIG. 9A is a front view of the die 900 of FIG. 8A.

FIG. 9B is a cross-sectional view of the die 900 of FIG. 9A along arrow M.

FIG. 10 is a cross-sectional view of the shaft/die box 1000 of FIG. 8A.

FIG. 15B is a side view of the former head base 1500 of FIG. 15A along arrow O.

FIG. 15C is a front view of the former head base 1500 of FIG. 15B along arrow P.

FIG. 15D is a top view of the former head base 1500 of FIG. 15B along arrow Q.

INDEX OF THE COMPONENTS IN THE DRAWING FIGURES

Figure 1A:
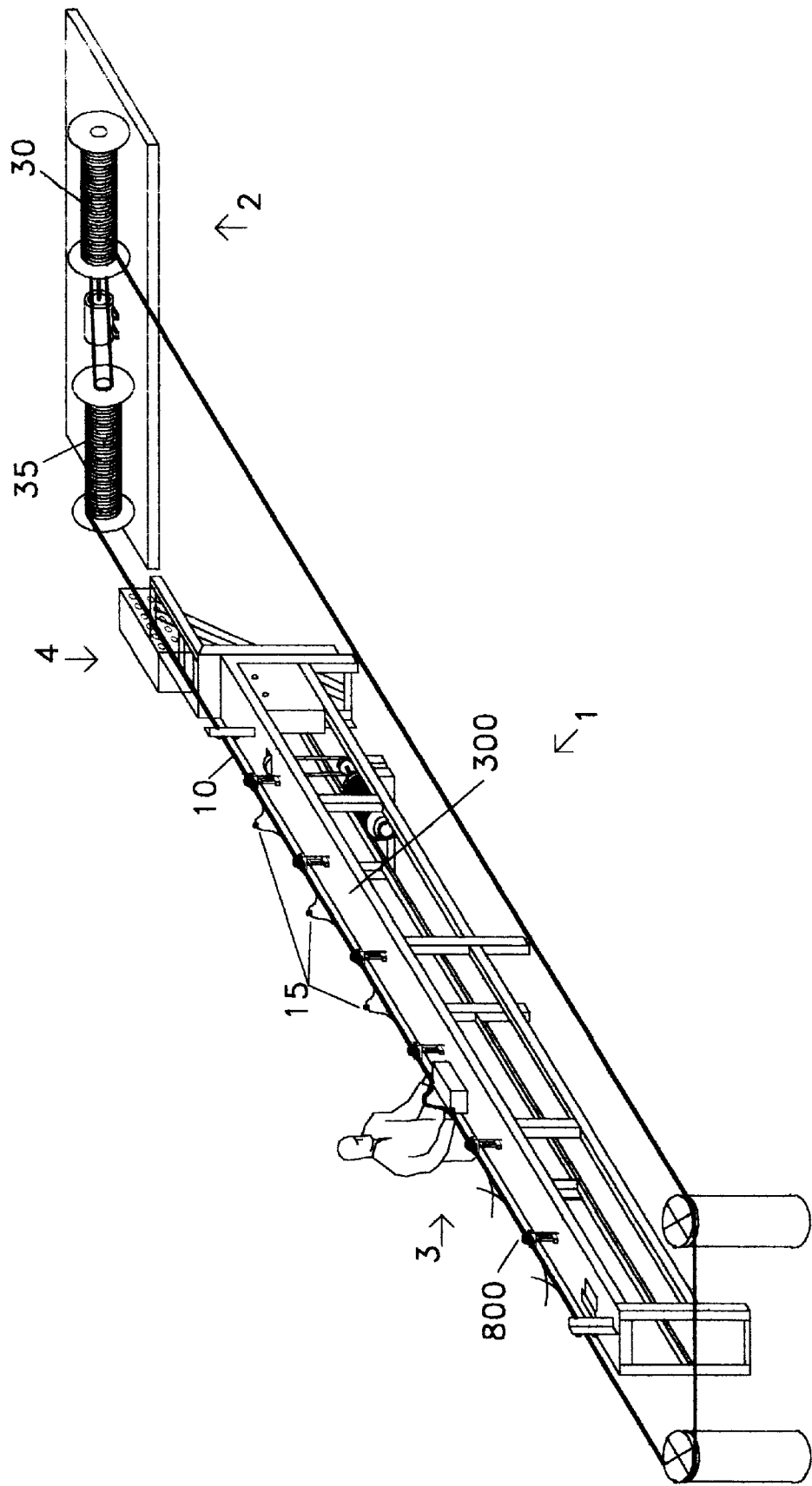
FIG. 1A is a schematic layout of the new Butt-End Welding/Arc Vanishing Cable Splicing System using the novel electromechanical Arc Vanishing Machine 1 and additional off-the-shelf equipment.
Figure 1B:
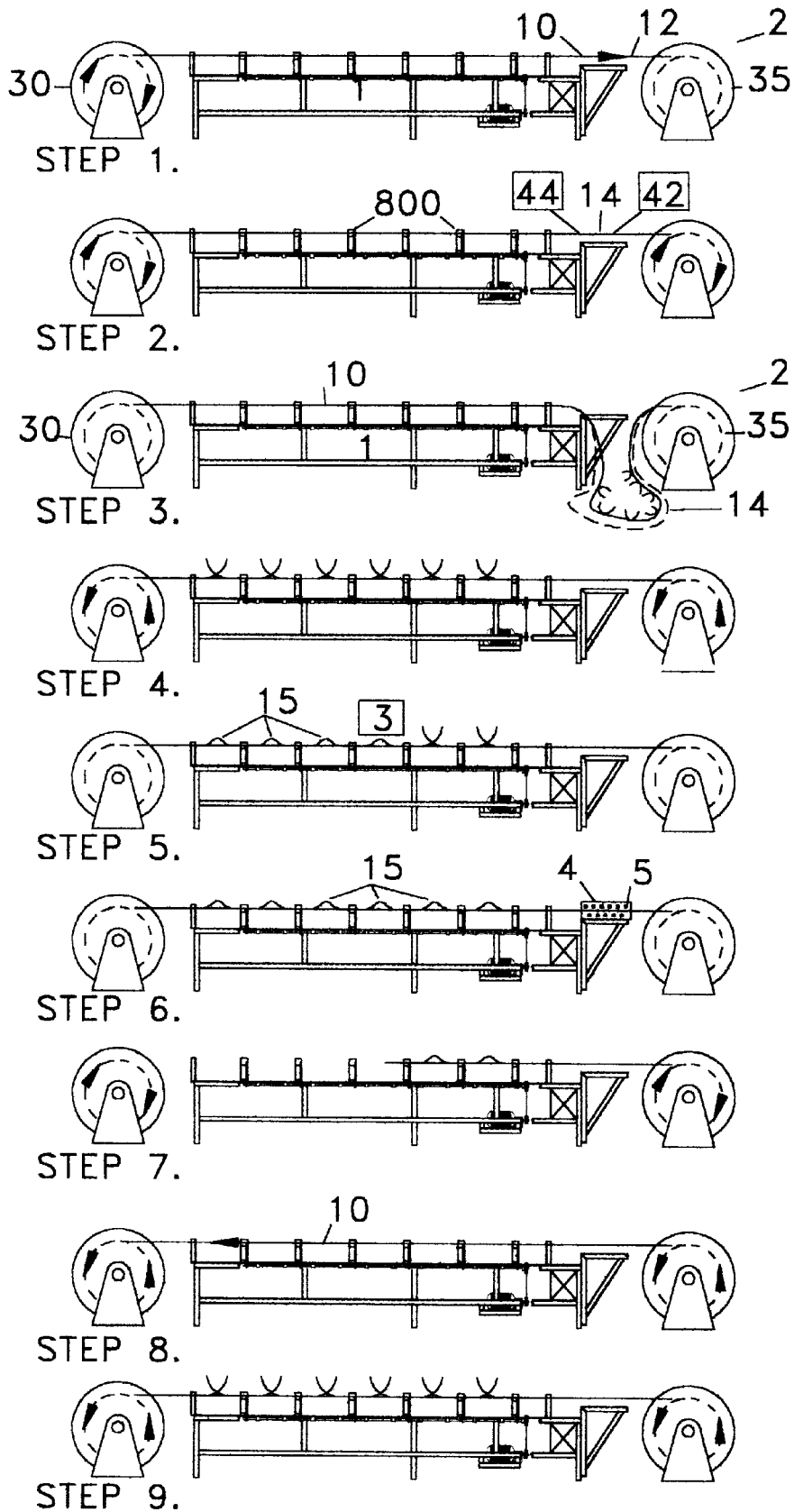
FIG. 1B shows the 10 step winding and unwinding procedure using a Spooling Equipment 2 connected to the Arc Vanishing Machine 1 of FIG. 1A, as the cable is repaired.
Figure 1C:
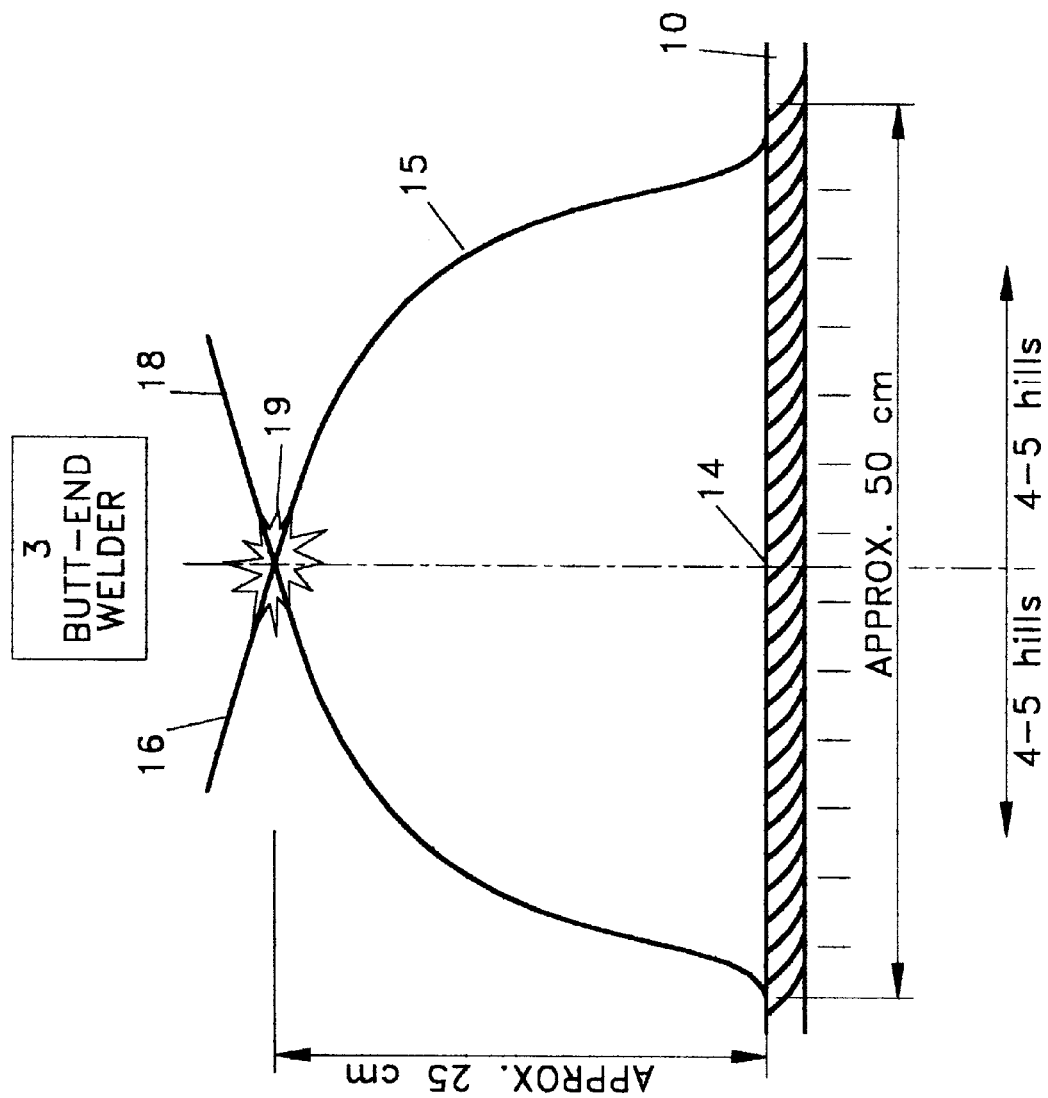
FIG. 1C is a diagram of the ARC conformed to be butt-end welded using the Butt-End Microwelder 3 of FIG. 1A.
Figure 1D:
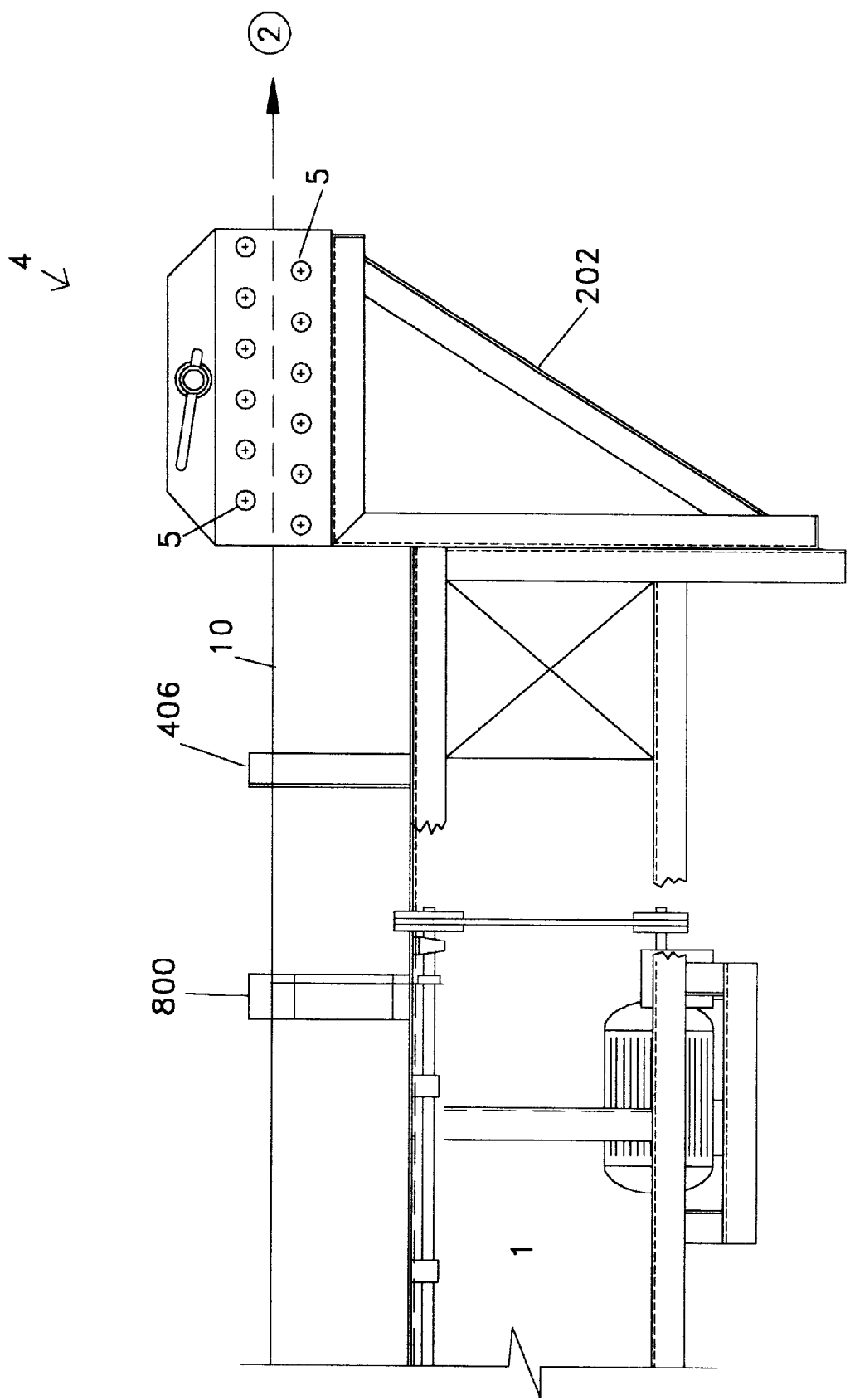
FIG. 1D is a diagram of the cable postforming procedure using the Cable Postformer 4 of FIG. 1A.
Figure 2A:
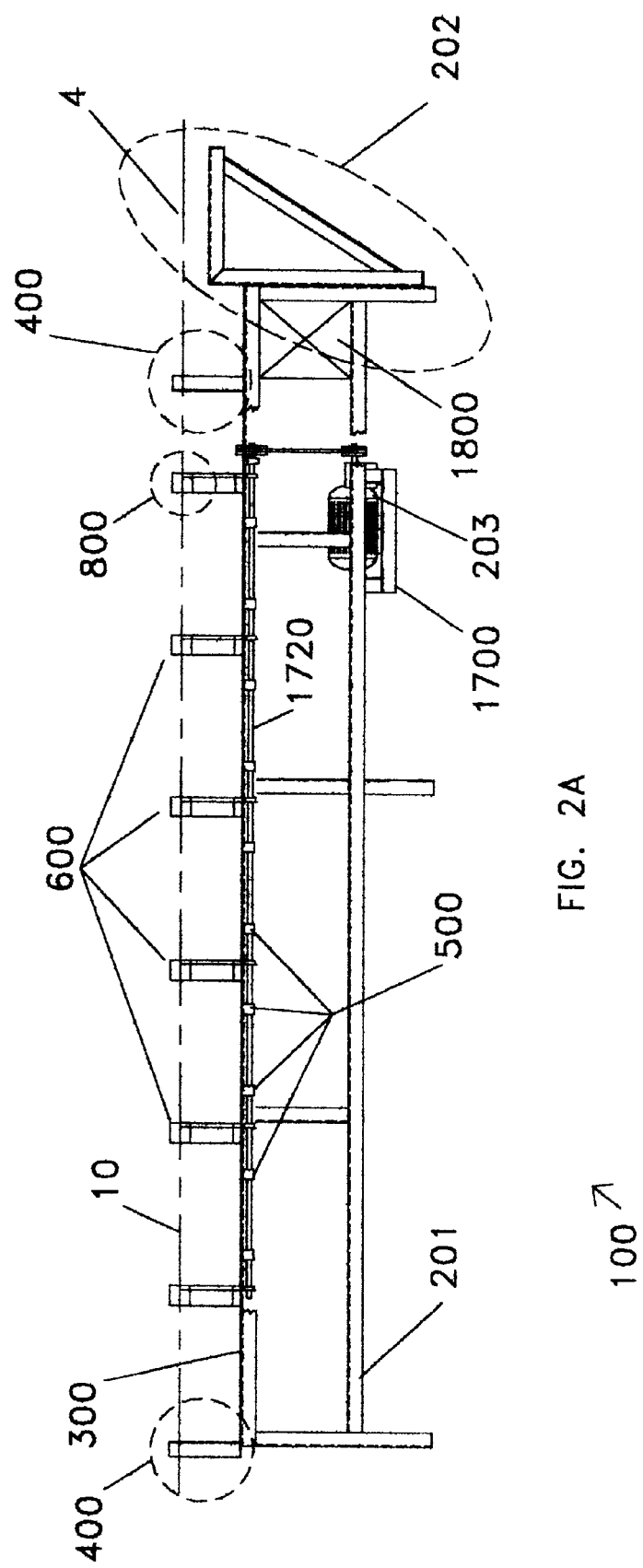
FIG. 2A is a side view of the machine 1 of FIG. 1E and FIG. 1A showing its support components 100.
Figure 2B:
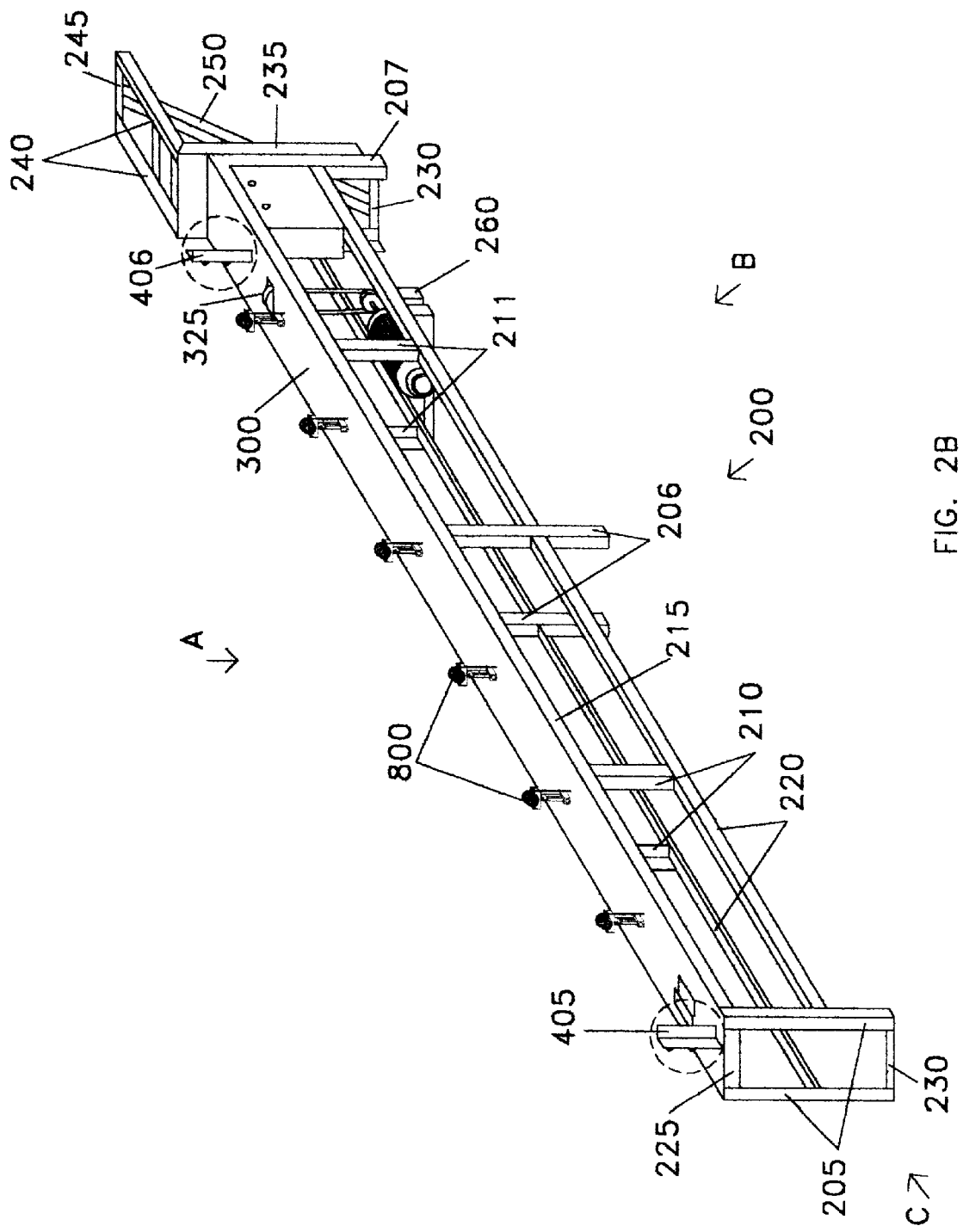
FIG. 2B is a perspective view of the support assembly 100 of FIG. 2A with framework 200.
Figure 2C:
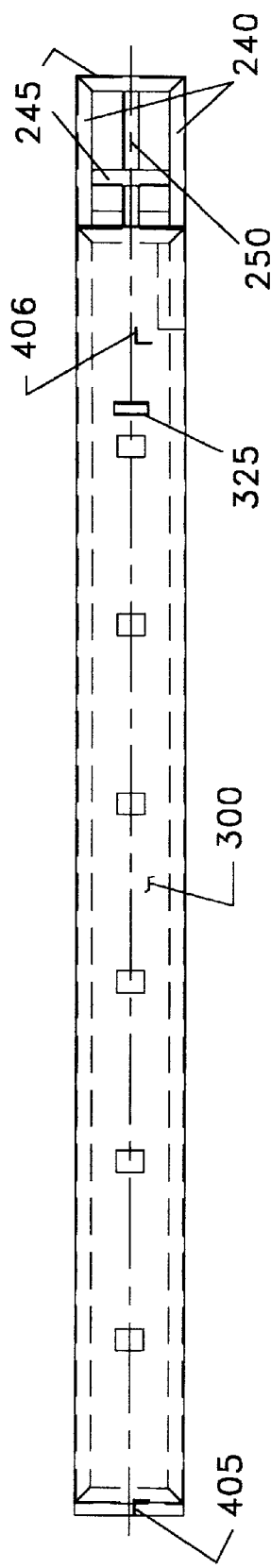
FIG. 2C is a top view of the framework 200 of FIG. 2B along arrow A.
Figure 2D:
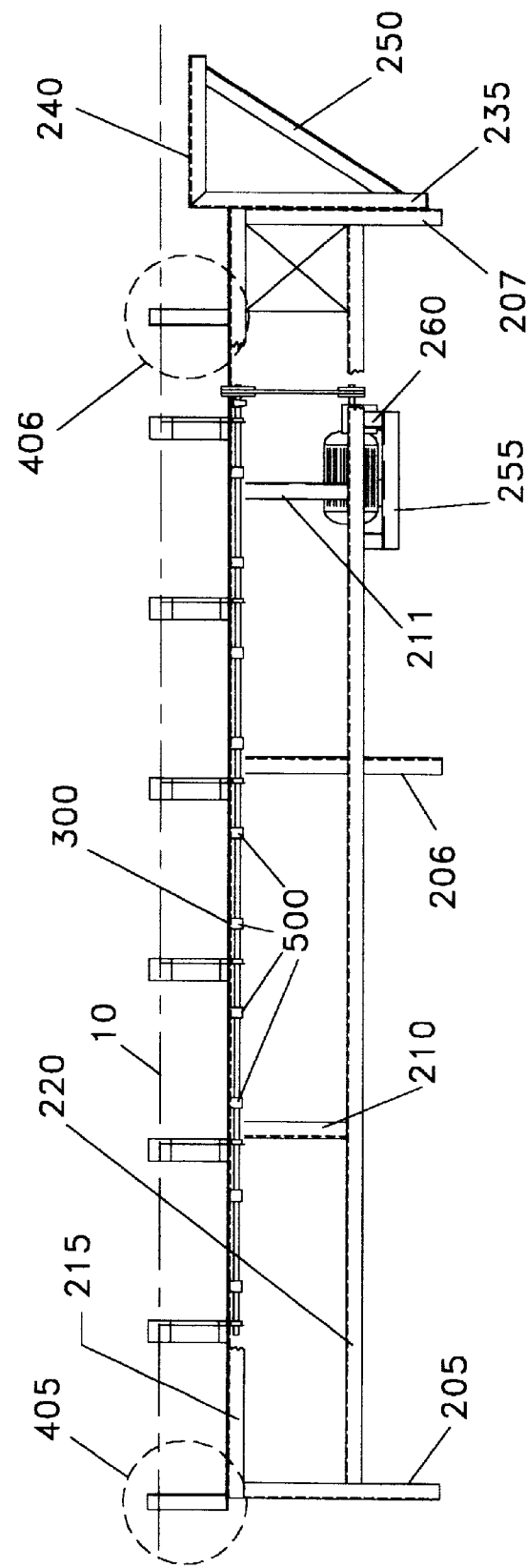
FIG. 2D is a side view of the framework 200 of FIG. 2B along arrow B.
Figure 3A:
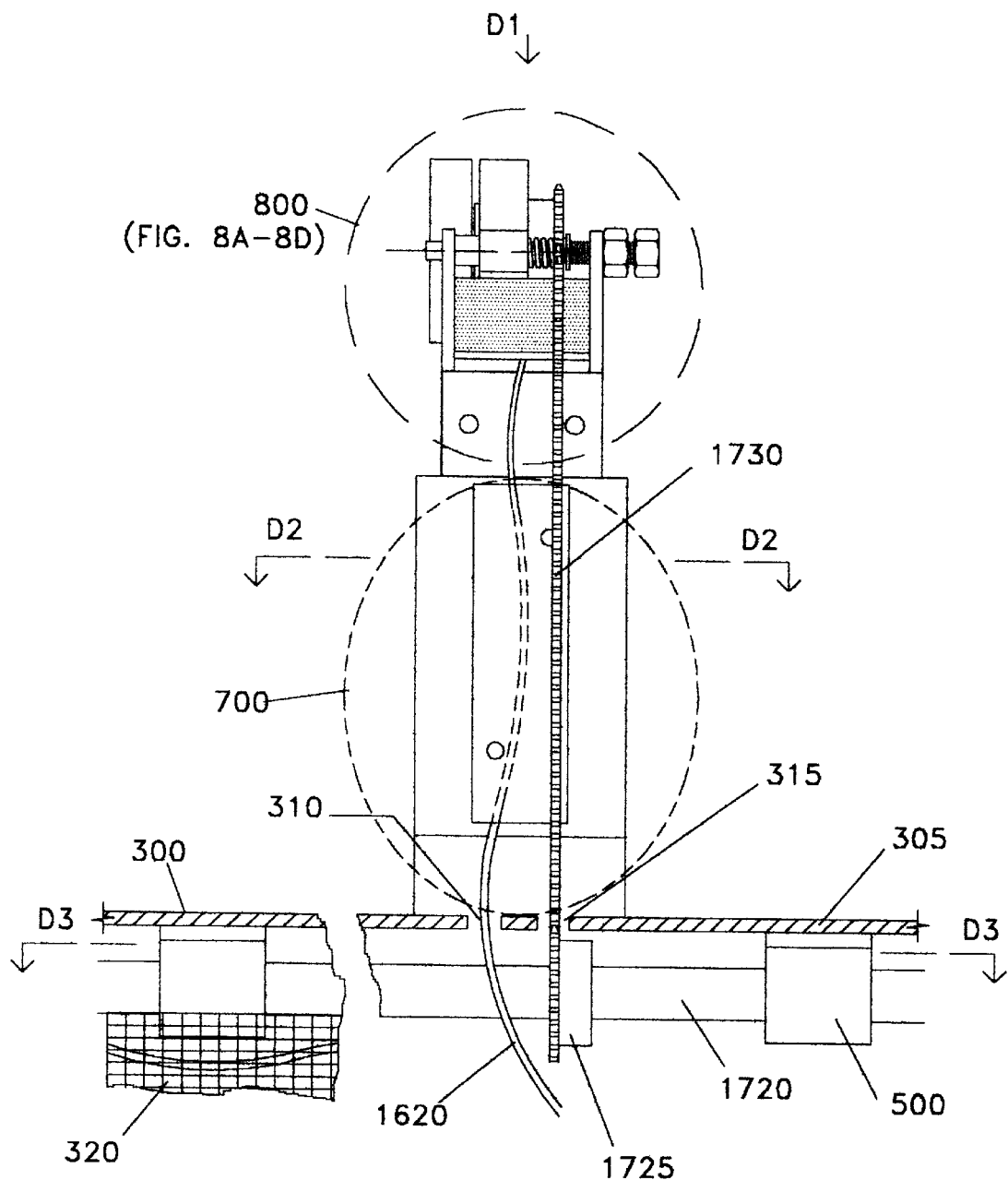
FIG. 3A is an enlarged view of Table 300 of FIG. 2D around a turret 600 (of FIG. 6A).
Figure 4A:
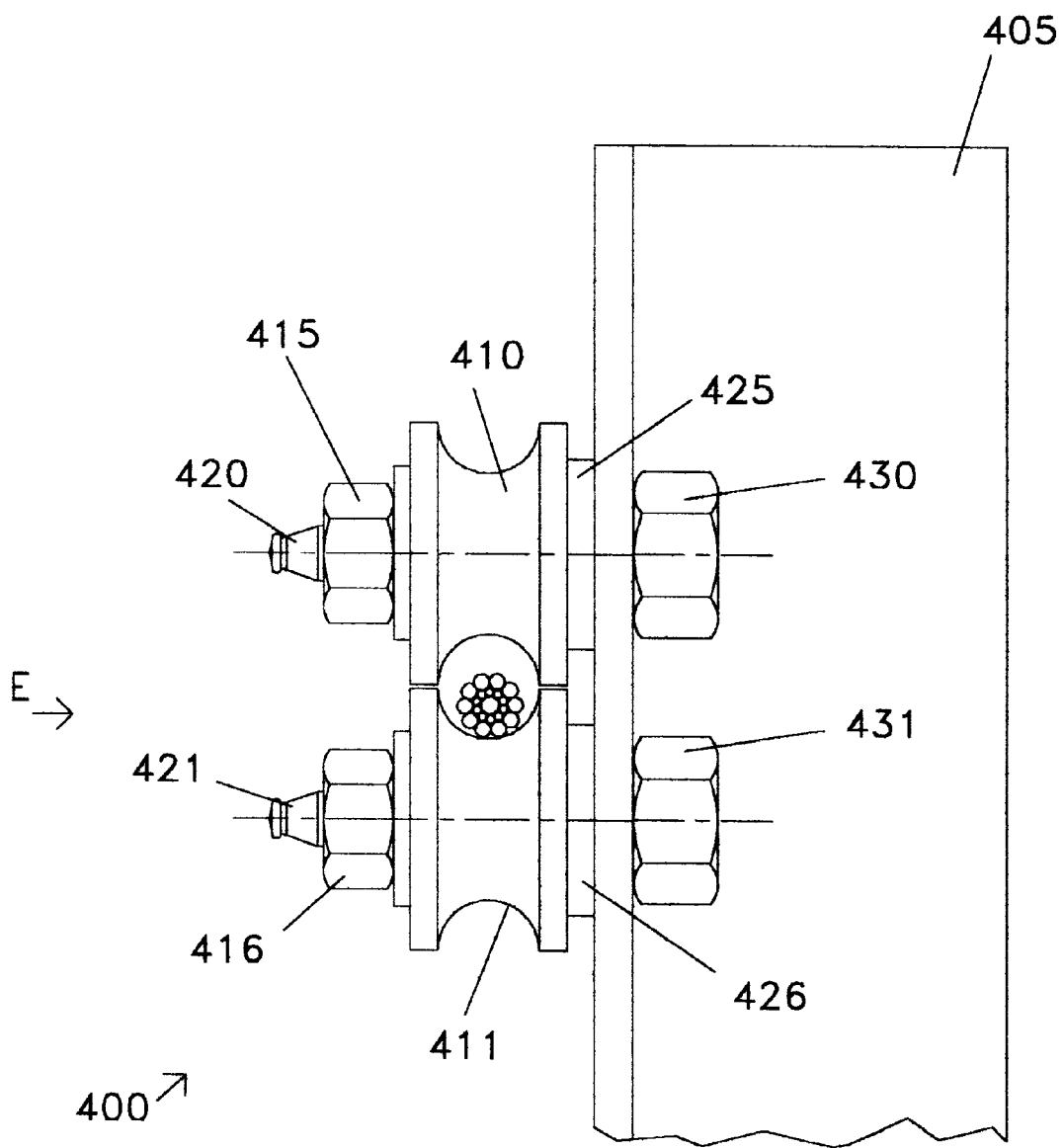
FIG. 4A is a front view of the top of the cable guides 400 of FIG. 2A.
Figure 4B:
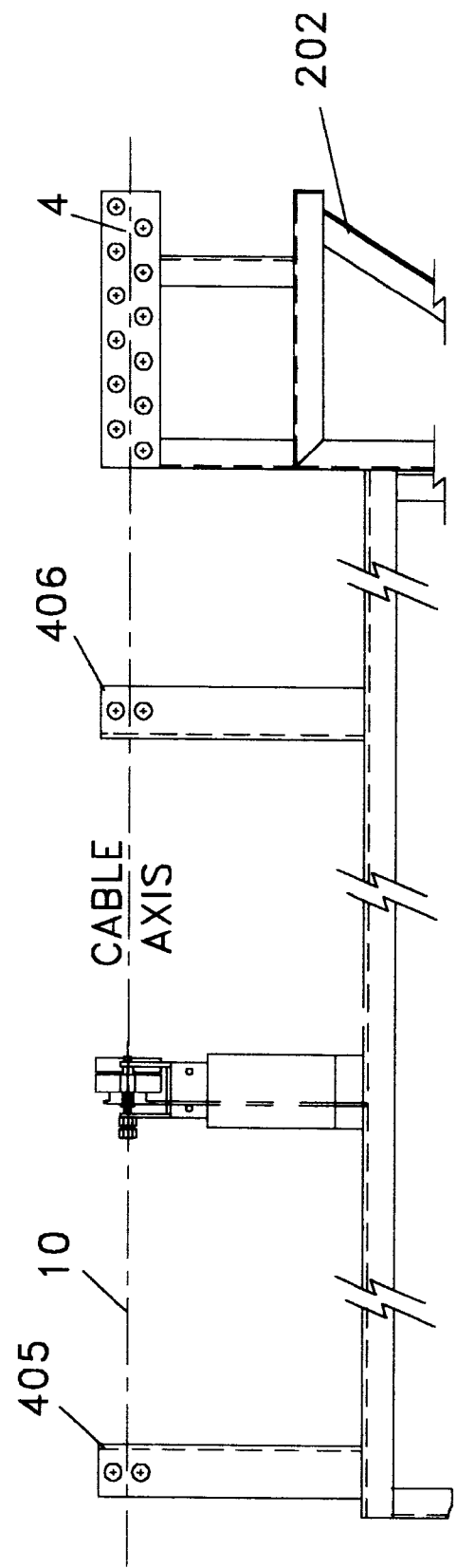
FIG. 4B is a side view of the cable guides 400 of FIG. 4A along arrow E.
Figure 5C:
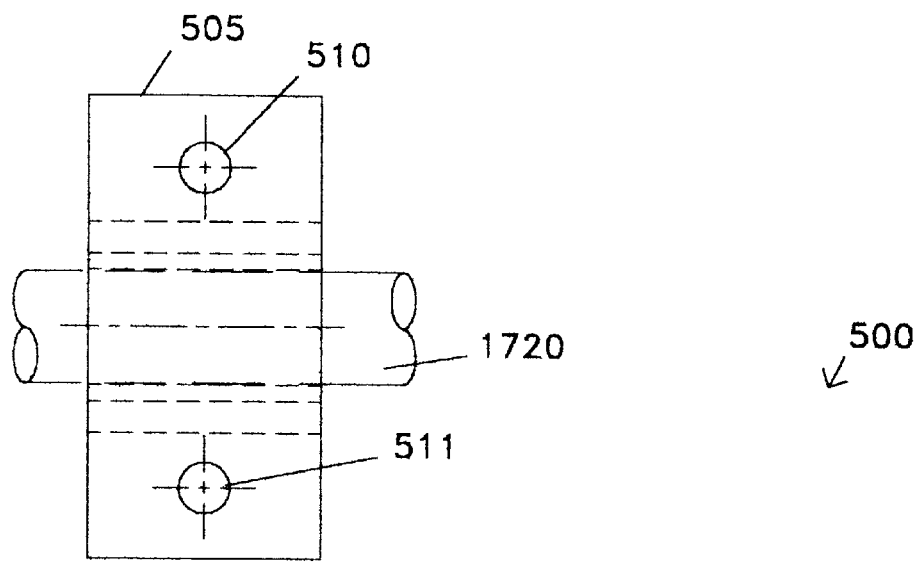
FIG. 5C is a top view of the hanger 500 of FIG. 5A along arrow G.
Figures 5A, 5B:
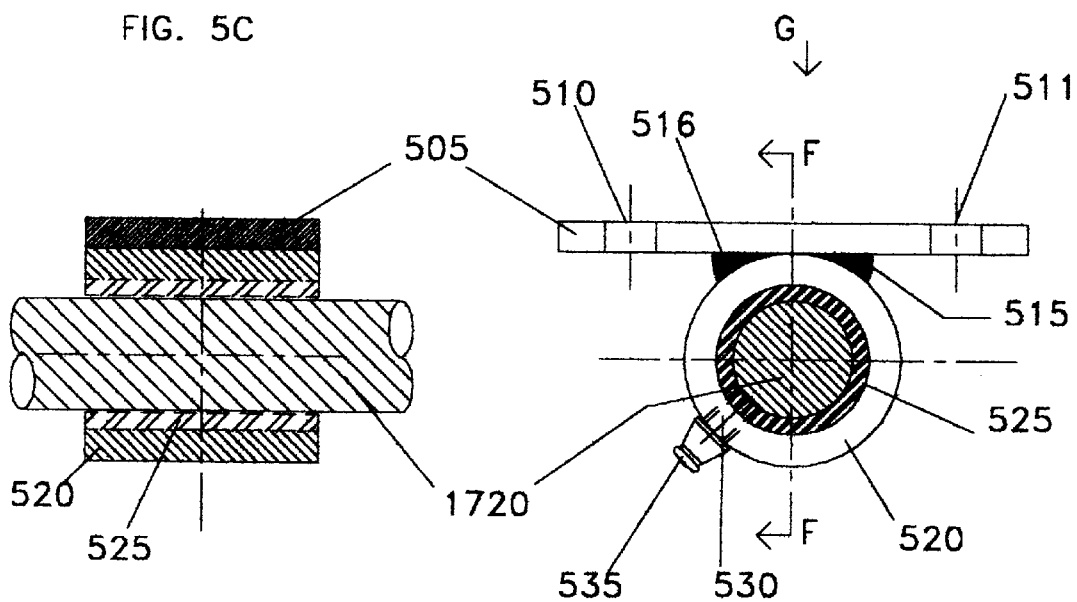
FIG. 5A is a front view of a transmission shaft hanger 500 of FIG. 3A and FIG. 1E.
FIG. 5B is a cross-sectional view of the hanger 500 of FIG. 4A along arrow F.
Figure 6A:
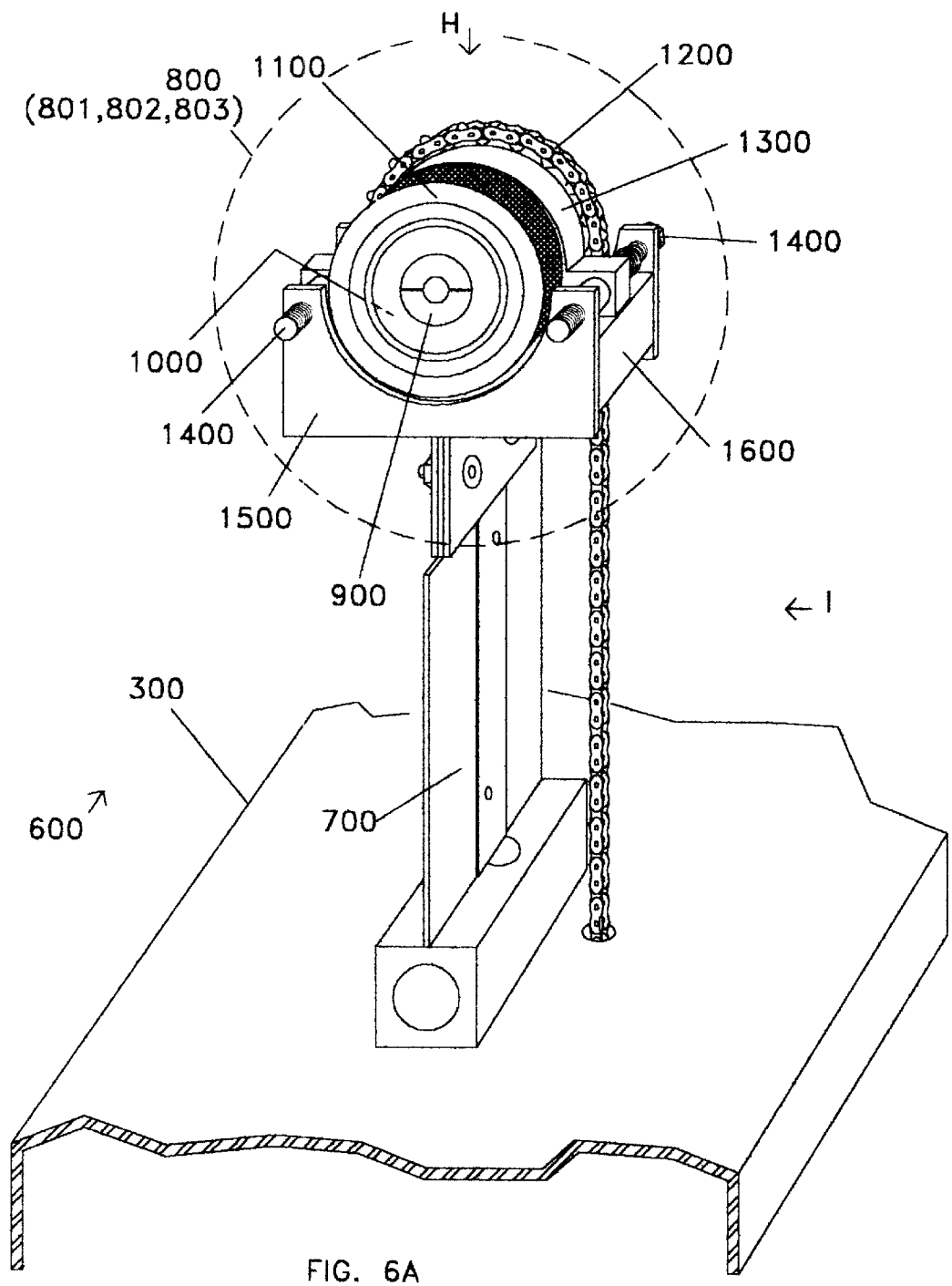
FIG. 6A is a perspective view of a turret 600 of the machine 1 of FIG. 1E.
Figure 14:
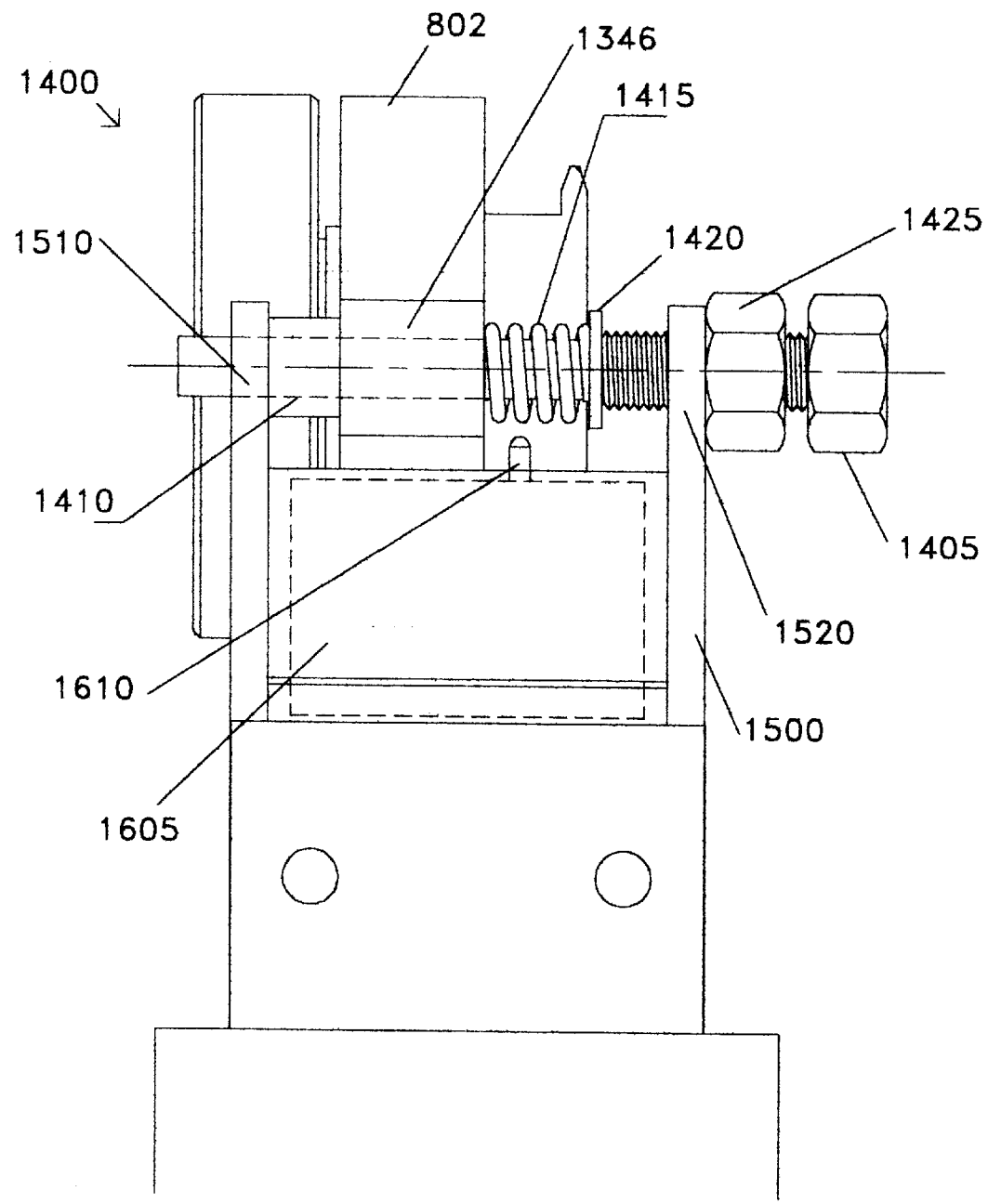
FIG. 14 is an enlarged side view of the base spacer 1400 on former head 800 of FIG. 8A.
Figure 15A:
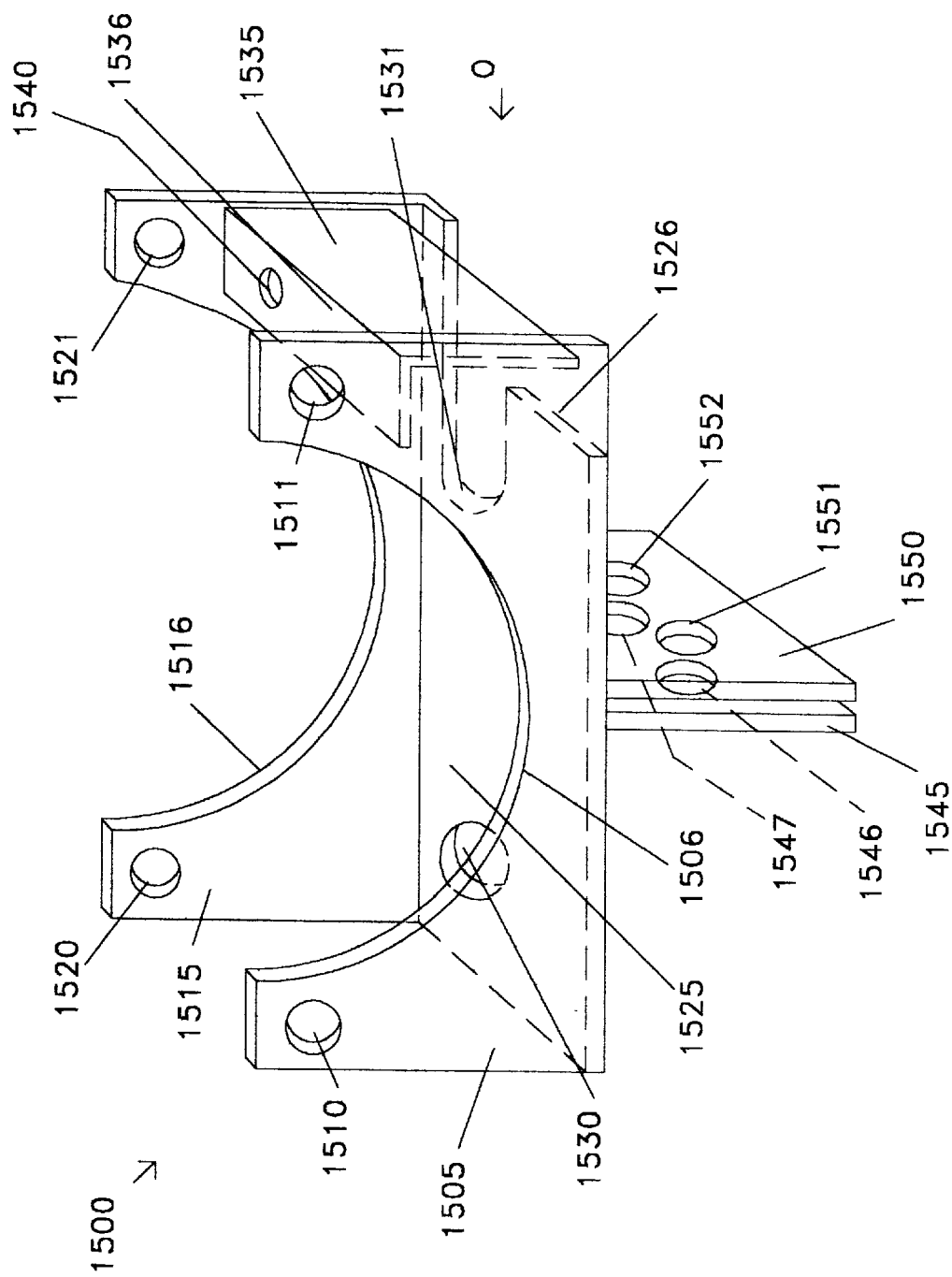
FIG. 15A is a perspective view of the former head base 1500 of FIG. 8A.
Figure 16:
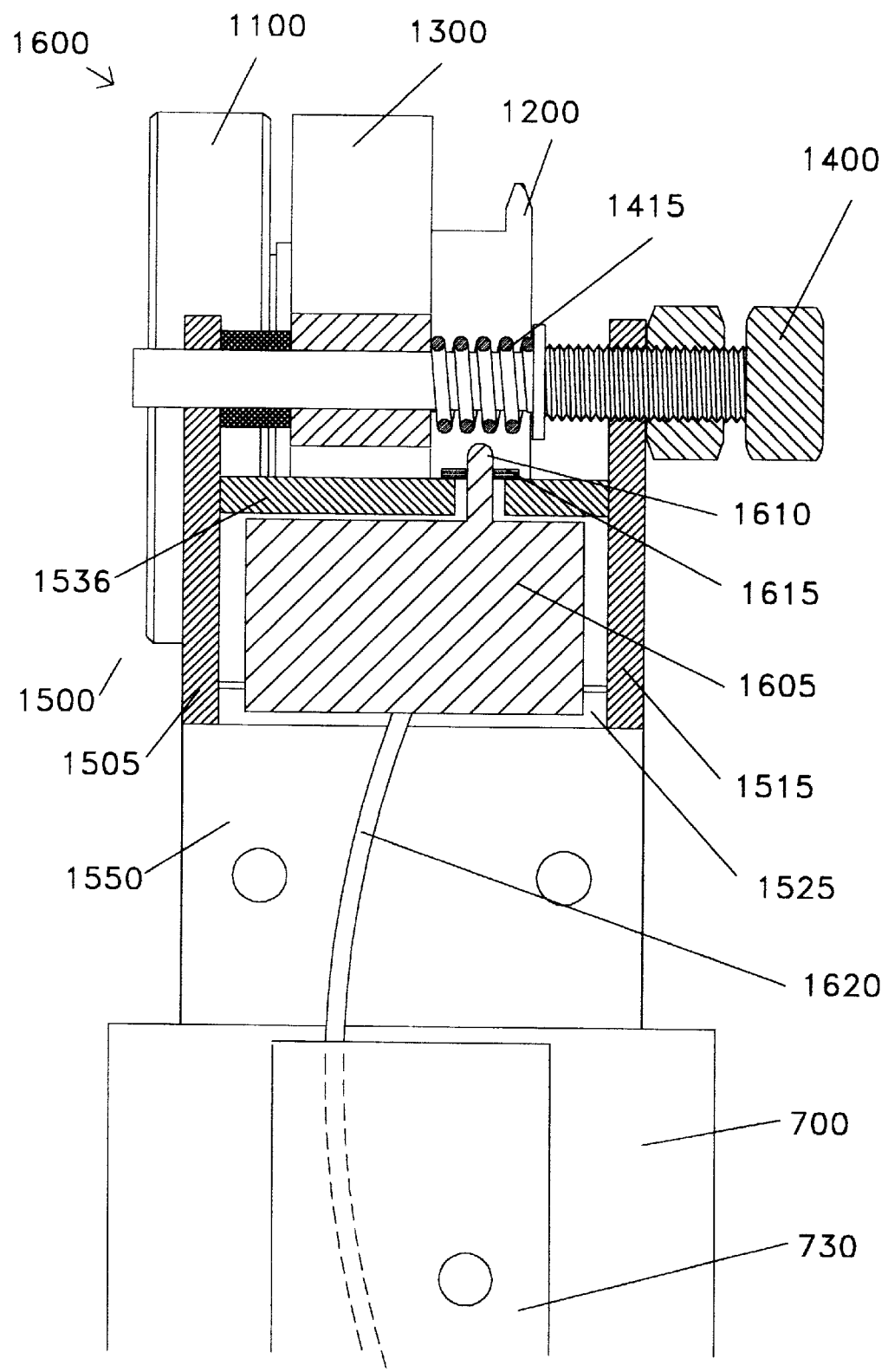
FIG. 16 is a cross-sectional view of the microswitch 1600 of FIG. 8A along base spacer vertical axis.
Figure 18:
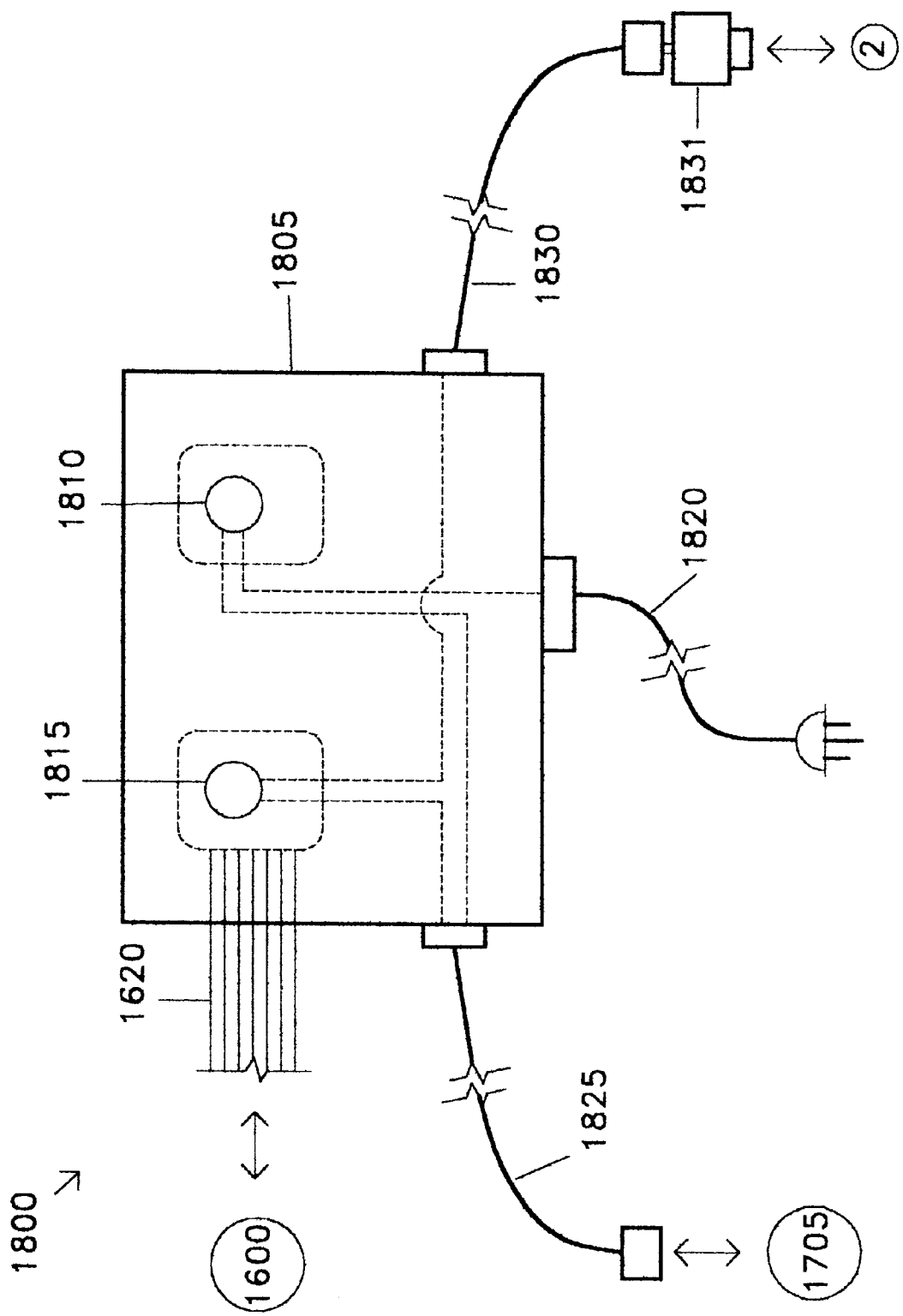
FIG. 18 is a diagram of the electric system assembly 1800 of FIG. 1E.

1 ARC—VANISHING MACHINE—FIGS. 1A, 1B
2 SPOOLING EQUIPMENT—FIGS. 1A, 1B
   30 First Reel
   35 Second Reel
3 BUTT-END MICROWELDER—FIG. 1A
4 POSTFORMER—FIGS. 1A, 1D
5 POSTFORMER ROLLERS
10 CABLE-FIGS. 1A, 1B, 1C
12 CABLE HEAD FIG. 4B
14 CABLE REPAIR PART/SPLICE POINT FIG. 1C
15 ARCS IN EXTERNAL CABLE WIRES FIG. 1C
16,18 WIRE OVER LAP ENDS—FIG. 1C
19 WELD POINT—FIG. 1C
42 BATTERY
44 DIGITAL VOLTMETER
1 ARC—VANISHING MACHINE
Support Assembly 100 (FIGS. 1E, 2A–2E)
Table Framework 200 (FIGS. 1E, 2A–2E)
Table Surface 300 (FIGS. 1E, 2A–2D, 6A, 6C)
Cable Guide Assembly 400 (FIGS. 1D, 1E, 2A–2D, 4A–4B)
Transmission Shaft Hangers 500 (FIGS. 1E, 2A, 2D, 3A, 3D, 5A–5C)
Turrets Assembly 600
Bracket 700 (FIGS. 6A–6C, 16)
Former Head 800 (FIGS. 1E, 6A, 8A–8D)
Die 900 (FIGS. 1E, 6A, 8A–8C, 9A–9B, 10, 11, 12)
Shaft/Die Box 1000 (FIGS. 1E, 6A, 8A–8C, 9B, 10, 12, 13B)
Adjusting Nut 1100 (FIGS. 1E, 6A–6C, 8A–8C, 11, 13B, 16)
Former Head Sprocket 1200 (FIGS. 1E, 6A–6C, 8A–8C, 10, 12, 16)
Bearing Box 1300 (FIGS. 1E, 6A–6C, 8A–8C, 10, 13A, 13B, 14, 16)
Base Spacer 1400 (FIGS. 1E, 6A–6C, 8A–8C, 14)
Former Head 1500 (FIGS. 1E, 6A–6C, 8A–8C, 14)
Failure Detection Microswitch 1600 (FIGS. 1E, 3A, 6A, 6C, 8A–8C, 14, 16, 18)
Rotary System 1700
Electric System 1800
  Support Assembly 100 (FIGS. 2A, 1E)
  FIG. 1E shows the major components for the Arc Vanishing Machine (AVM) 1 of FIG. 1A. Support structure for the turrets 600, the rotary system 1700, the electric system 1800 and the postformer 4, also provides a guiding structure for the cable. Consists of the table framework 200 (with its table's structure 201, postformer rack 202 and electric motor base 203) the table surface 300, the transmission shaft hangers 500 and the cable guides 500.
  Table Framework 200 (FIGS. 1E, 2A–2E)
    (Table Structure 201, Postformer Rack 202, Motor base 203) (FIGS. 2A, 4A)
    Table dual vertical ground based supports 205/206/207 (FIGS. 2B, 2D, 2E)
    Table dual vertical intermediate supports 210/211 (FIGS. 2B, 2D)
    Table dual longitudinal top supports 215 (FIGS. 2B, 2D)
    Table dual longitudinal intermediate supports 220 (FIGS. 2B, 2D)
    Table horizontal top cross-bars 225 (FIGS. 2B, 2E)
    Table dual horizontal ground based crossbars 230 (FIGS. 2B, 2E)
    Postformer dual vertical supports 235 (FIGS. 2B, 2D)
    Postformer dual longitudinal top supports 240 (FIGS. 2B, 2C, 2D)
    Postformer transversal top supports 245 (FIGS. 2B, 2C)
    Postformer angled support 250 (FIGS. 2B, 2C, 2D)
    Electric motor dual longitudinal supports 255 (FIGS. 2D, 2E)
    Electric motor dual transversal supports 260 (FIGS. 2B, 2D)
  Table Surface 300 (FIGS. 1E, 2A–2D, 6A, 6C)
    Horizontal steel plate 305 (FIGS. 2E, 3A)
    Slot for Electric cable pass 310 (FIGS. 3A, 3C)
    Slots for transmission chain pass 315/316 (FIGS. 3A, 3C)
    Grid for holding microswitch cables 320 (FIGS. 3A, 3D)
    Clearance for pulley 325 (FIGS. 2B, 2C, 2E)
    Through-holes for hangers 330/331 (FIG. 3D)
  Cable Guide Assembly 400 (FIGS. 1D, 1E, 2A–2D, 4A–4B)
    Inlet guiding pulley guide 405 (FIGS. 2B, 2C, 2D, 4A, 4B)
    Outlet guiding pulley guide 406 (FIGS. 1D, 2B, 2C, 2D, 4B)
    Pulley 410/411 (FIG. 4A)
    Nut 415/416 (FIG. 4A)
    Grease cup 420/421 (FIG. 4A)
    Washer 425/426 (FIG. 4A)
    Machined bolt 430/431 (FIG. 4A)
  Transmission Shaft Hangers 500 (FIGS. 1E, 2A, 2D, 3A, 3D, 5A–5C)
    Steel plate 505 (FIGS. 5A–5C)
    Through-holes 510/511 (FIGS. 1E, 5A, 5B, 5C)
    Longitudinal fillet welding 515/516 (FIG. 5A)
    Drilled steel round bar 520 (FIGS. 5A, 5B)
    Brass bushing 525 (FIGS. 5A, 5B)
    Threaded hole for grease cup 530 (FIG. 5A)
    Grease cup 535 (FIG. 5A)
Turrets Assembly 600 (FIGS. 1D, 1E, 6A–6C, 7A–7B, 8A–8D)
  Set of 6 for this preferred embodiment. Consist each of a column/bracket 700 with a former head 800 on top set on the table surface 300.
  Bracket 700 (FIGS. 6A–6C, 16)
  Bracket body 705 (FIGS. 7A–7B)
  Bracket top 710 (FIGS. 7A–7B)
  Steel square bar 715 (FIGS. 7A–7B)
  Hole through the square bar 716 (FIGS. 7A–7B)
  Holes for fixing former head 720/721 (FIGS. 7A–7B)
  Threaded holes for microswitch cables protection plate fixing 725/726 (FIG. 7B)
  Microswitch cables protection plate 730 (FIGS. 7A–7B, 16)
  Filet welding 735/736 (FIGS. 7A–7B)
  Former Head 800 (800, 802, 803) (FIGS. 1E, 6A, 8A–8D)
  Spinning assembly 801 (FIGS. 6A, 8A, 8D)

Figure 2E:
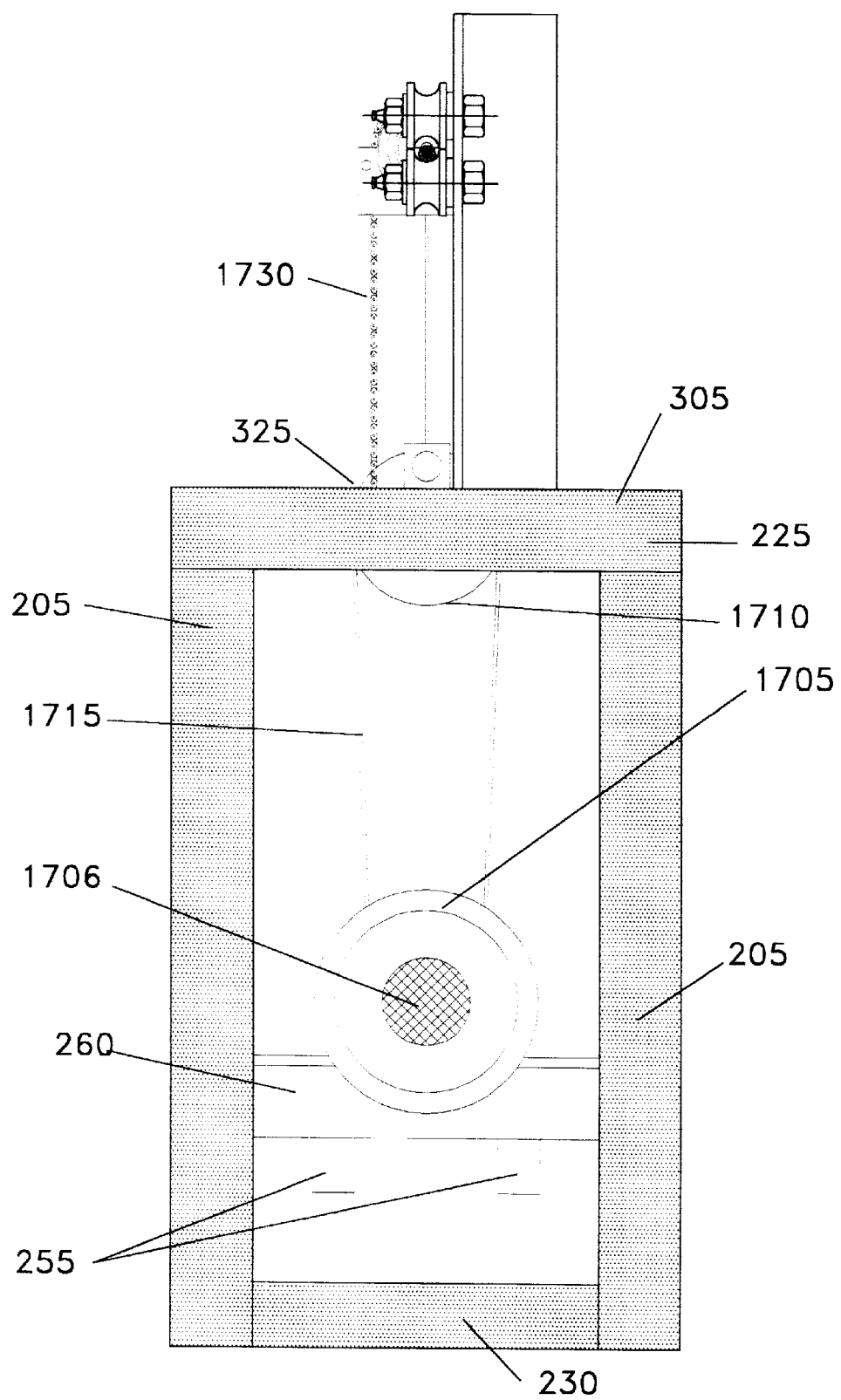
FIG. 2E is an enlarged front view of the framework 200 of FIG. 2B along arrow C.
Figure 17:
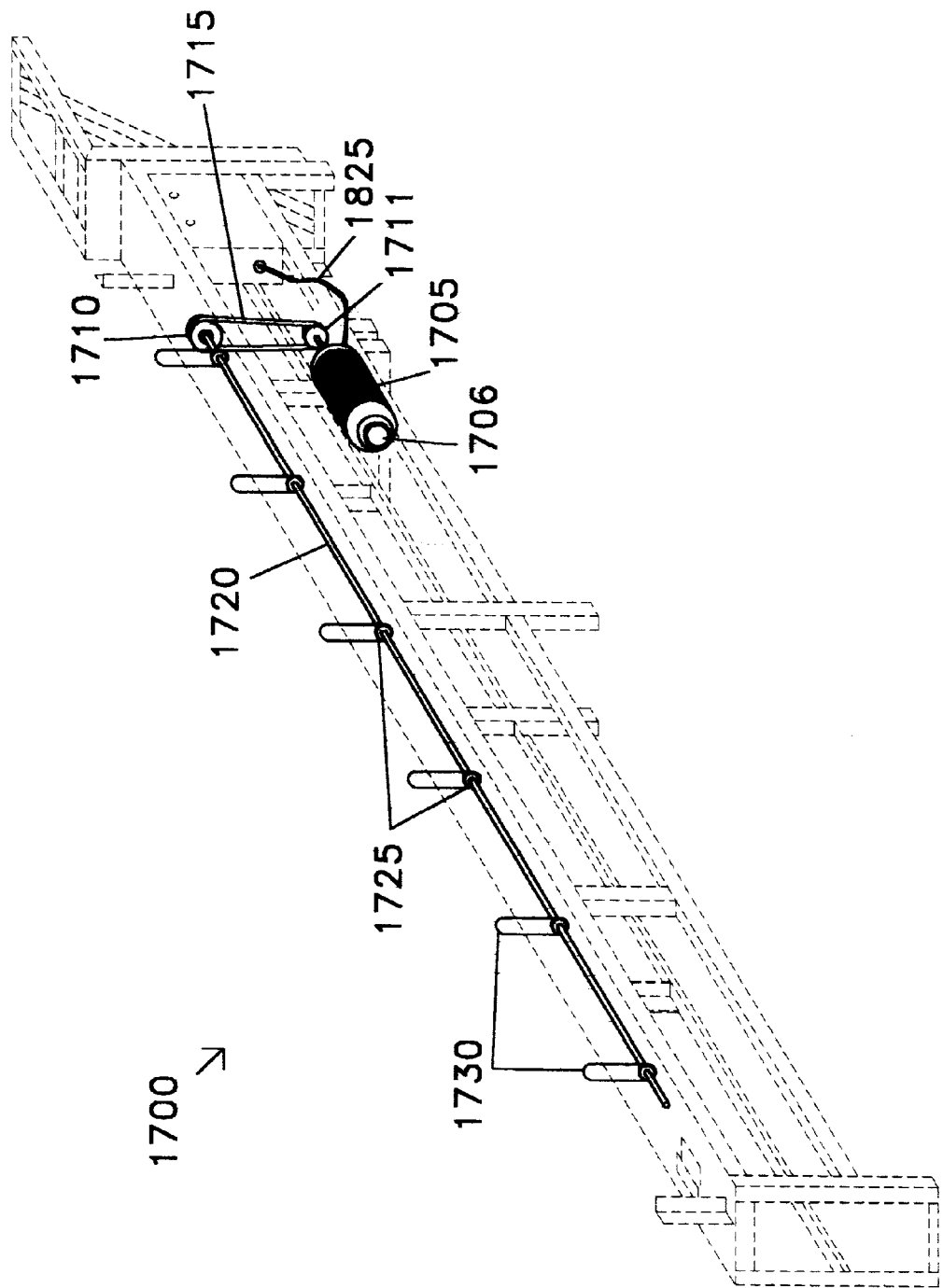
FIG. 17 is a diagram of the rotary system assembly 1700 of FIG. 1E.

801 includes components 900, 1000, 1100, 1200
Mobile assembly 802 (FIGS. 6A, 8A, 8D)
802 includes component 1300, 1400
Fix assembly 803 (FIGS. 6A, 8A, 8D)
803 includes components 1500, 1600
Die 900 (FIGS. 1E, 6A, 8A–8C, 9A–9B, 10, 11, 12)
Halves 905 FIG. 9A)
Die hole 910 (FIGS. 9A–9B)
Die front face 915 (FIGS. 9A–9B)
Internal surfaces diameter difference 920 (FIGS. 9A–9B)
Conical external die surface 925 (FIGS. 9A–9B)
Shaft/Die-Box 1000 (FIGS. 1E, 6A, 8A–8C, 9B, 10, 12, 13B)
  Die box conical front portion 1005 (FIG. 10)
  Die box rear shaft for sprocket 1010 (FIG. 10)
  Die box hole for cable pass 1015 (FIG. 10)
  Die box internal conical surface 1020 (FIG. 10)
  Left hand thread for adjusting nut 1025 (FIG. 10)
  Butt surface for ball bearing 1030 (FIG. 10)
  Adjusting surface for ball bearing 1035 (FIG. 10)
Adjusting Nut 1100 (FIGS. 1E, 6A–6C, 8A–8C, 11, 13B, 16)
  Rough exterior surface 1105 (FIG. 11)
  Adjusting nut body 1110 (FIG. 11)
  Gap on nit body 1115 (FIG. 11)
  Nut center body 1120 (FIG. 11)
  Left-hand thread for die box 1125 (FIG. 11)
  Butt surface for die 1130 (FIG. 11)
Former Head Sprocket 1200 (FIGS. 1E, 6A–6C, 8A–8C, 10, 12, 16)
  Sprocket body 1205 (FIG. 12)
  Exterior teeth 1210 (FIG. 12)
  Threaded side hole 1215 (FIG. 12)
  Set-screw 1220 (FIG. 12)
Bearing Box 1300 (FIGS. 1E, 6A–6C, 8A–8C, 10, 13A, 13B, 14, 16)
  Bearing box body 1305 (FIG. 13A, 13B)
  Ball bearing 1310 (FIG. 10, 13A, 13B)
  Retaining ring 1315 (FIG. 13A, 13B)
  Butt surface for retaining ring 1320 (FIG. 13B)
  Groove for retaining ring 1325 (FIG. 13B)
  Adjusting internal surface for ball bearing 1330 (FIG. 13A, 13B)
  Butt surface for ball bearing 1335 (FIG. 13B)
  Through holes for base spacers 1340/1341 (FIG. 13A)
  Flange ends 1345/1346 (FIGS. 13A, 14)
Base Spacer 1400 (FIGS. 1E, 6A–6C, 8A–8C, 14,16)
  Machined bolt 1405 (FIG. 14)
  Spacer 1410 (FIG. 14)
  Spring 1415 (FIGS. 14, 16)
  Washer 1420 (FIG. 14)
  Nut 1425 (FIG. 14)
Former Head Base 1500 (FIGS. 1E, 6A–6C, 8A–8C, 14, 15A–15C, 16)
  Front steel plate 1505 (FIGS. 15A–15C, 16)
  Limit of surface in front steel plate 1506 (FIGS. 15A, 15C)
  Flat holes on front plate 1510/1511 (FIGS. 14, 15A–15C)
  Back steel plate 1515 (FIGS. 15A, 15B, 15D, 16)
  Limit of surface in back steel plate 1516 (FIGS. 15A)
  Threaded holes on back plate 1520/1521 (FIGS. 14, 15A, 15B, 15D)
  Bottom steel plate 1525 (FIGS. 15A, 15B, 15D, 16)
  Limit of surface in bottom steel plate 1526 (FIG. 15A)
  Slots on bottom plate 1530/1531 (FIGS. 15A, 15D)
  Microswitch plates 1535/1536 (FIGS. 15A, 15B, 15D)
  Hole for microswitch interrupter 1540 (FIGS. 15A, 15D)
  Base fixing plates 1545/1550 (FIGS. 15A–15C, 16)
  Base fixing holes 1546/1547/1551/1552 (FIGS. 15A–15C)
Failure Detection Microswitch 1600 (FIGS. 1E, 3A, 6A, 6C, 8A–8C, 14, 16, 18)
  Microswitch box 1605 (FIGS. 14, 16)
  Microswitch interrupter 1610 (FIGS. 14, 16)
  Microswitch fixing nut 1615 (FIG. 16)
  Microswitch cables 1620 (FIGS. 3A, 6C, 16, 18)
Rotary Assembly 1700 (FIGS. 1E, 3A–3D, 5A–5D, 6C, 12,17, 18)
  ELECTRIC MOTOR 1705 (FIGS. 2E, 17, 18)
  ELECTRIC MOTOR PROTECTIVE GUARD 1706 (FIGS. 2E, 17)
  PULLEY 1710/1711 (FIGS. 2E, 17
  TRANSMISSION BELT 1715 (FIGS. 2E, 17
  TRANSMISSION SHAFT 1720 (FIGS. 3A, 3D, 5A–5D, 17)
  SHAFT SPROCKETS 1725 (FIGS. 3A, 3D, 17)
  ROLLER CHAINS 1730 (FIGS. 2E, 3A, 6C, 12, 17)
Electric Assembly 1800 (FIGS. 1E, 18)
  CONTROL PANEL 1805 (FIG. 18)
  POWER SUPPLY SWITCH 1810 (FIG. 18)
  SECURITY SENSOR 1815 (FIG. 18)
  POWER SUPPLY OUTLET 1820 (FIG. 18)
  ELECTRIC MOTOR CONNECTION 1825 (FIG. 18)
  SPOOLING EQUIPMENT CONNECTION 1830 (FIG. 18)
  SPOOLING TRANSMISSION PNEUMATIC VALVE 1831 (FIG. 18)

DESCRIPTION OF THE GENERAL OPERATION PROCESS

Before explaining in detail the operation process of the present splicing method it is to be understood that the invention is not limited in its application to the details of the particular arrangement shown since the invention is capable of other embodiments. Also, the terminology used herein is for the purpose of description and not of limitation.

This splicing method offers multiple applications, from repairing an individual outer armor wire break to splicing the two sections of a cut-off cable. Details of repairing a cable electrical break down will be illustrated to explain the operation process of this novel Butt-End Welding & Arc Vanishing Electromechanical Cable Splicing System.

The steps of this novel cable splicing method will be described in reference to FIG. 1A and the ten (10) steps of FIG. 1B. Set-up of the equipment and cable installation occurs in step 1, where the cable 10 to be repaired is set on a reel 30 of the spooling equipment 2. Locating the short cut in cable 10 is done using a conventional process of determining the electrical resistance of the line with a battery 42 and a digital voltmeter 44 and as described in the background section of the invention. The cable head 12 is passed manually through the former heads 800 of the Arc Vanishing Machine 1 (AVM) and fixed to the winch 35 of the spooling equipment 2.

The spooling equipment 2 is turned on and the cable 10 is spooled to reach the section 14 to be repaired as shown in step 2.

In step 3 between the Arc Vanishing Machine 1 (AVM) and the spooling equipment 2, practices described in the background section of the subject invention are followed.

(a) the cable is cut at the section needing repairs (b) an inner conductor core and inner armor layer is repaired and respliced.

(c) the outer armor layer is prepared for being reconnected using the novel invention.

In step 3, the outer armor splicing points are spaced in approximately 80 cm. from one another leaving wire overlaps of approximately 40 cm. in each direction (FIG. 1C). They are fixed with adhesive tape (not shown) to allow the spooling and pass of the cable through the AVM former heads.

Referring to step 4 in FIG. 1B, the cable is rewound until the first six wires to be spliced are positioned before each of the 6 turrets of the machine (if it was a 9 turrets machine, 9 wires would be taken . . . )

In step 5 of FIG. 1B, each of the 6 wires is butt-end welded leaving a loose arc (FIG. 1C) that is to be vanished by the action of the spinning assembly of the former head in order to reestablish the original configuration of the cable.

In step 6 of FIG. 1B, the outer armor wire arcs are ready to be vanished. When a group of arcs is ready to be vanished the appropriate size dies are set into the former heads. The Postformer 4 is set in place, rollers 5 are chosen and adjusted, FIG. 1D.

In step 7 of FIG. 1B, the rotary system of the AVM is activated. Each spinning assembly starts rotating in the same direction as the helical waves of the outer armor wires rotate. The spooling equipment is also activated. As it rewinds, the cable is forced to pass through the dies, each of which exerts friction on one of the wire arcs resulting from the butt-end welding. The cable is spooled through the AVM to its very end in order to vanish the first group of arcs. As the cable leaves the AVM 1, cable postforming (reconditioning twist and postform) occurs. The cable is passed through cable postformer 4 to test the welding effectiveness and detect eventual imperfections on them.

In steps 8 and 9, the cable is rewound until positioning the next group of wires to be repaired. The process is repeated (step 10) until all the wires of the outer armor are respliced. Butt-End Welding/Arc Vanishing Cable Splicing System & 1 Arc Vanishing machine. FIG. 1A

FIG. 1A shows a schematic layout of the novel system using the novel electromechanical Arc Vanishing Machine 1 and the Spooling Equipment 2, Butt-end Microwelder 3 and Postformer 4.

Referring to FIG. 1A, the novel invention consists of the Arc Vanishing Machine (AVM) 1 created to vanish, as the cable is spooled through it by a Spooling Equipment 2, the arcs 15 resulting of the outer armor wire splicing using a Butt-End Microwelder 3 (described in reference to FIG. 1C), which welding effectiveness is guaranteed by the pass of the cable 10 through the Postformer 4.

The Arc Vanishing machine 1 provides a die size for each cable diameter. Die configuration in two halves (which will be described later in reference to FIGS. 9A–9B) allows them to be fixed and removed from the former heads 800 even after the cable is positioned on the AVM 1 and connected to both ends 30, 35 of the spooling equipment 2.

Dies are placed on the former heads 800 only for the arc 15 vanishing, for all other steps of the process dies are removed to allow the pass of the cable through the former heads.

Dies rotation combined with the friction they exert on the arcs as the cable 10 is spooled, re-accommodate the wires following their original helical wave paths, displacing the arcs until their vanishing at the cable's end.

The pass of the cable 10 through the AVM 1 can be obstructed by a wire jam during the vanishing process. An immediate stop of the former heads rotation and of the cable spooling are required to avoid the break of that wire. For this purpose the AVM 1 is provided with a security system (shown and described in reference to FIG. 18) connected to its rotary system and to the Spooling Equipment.

If a wire is stuck and a former head bearing box breaks or surpasses the resistance of the base spacers springs and moves forward, a microswitch positioned on its base is activated. All the microswitches are connected to a sensor in the control panel.

When the sensor is activated by one of the microswitches, it stops the motor of the rotary system. It also sends an electric signal to a pneumatic valve adapted to the transmission of the spooling equipment setting it in neutral position and consequently stopping the spooling of the cable.

Once the jam is located and manually unstuck and the former heads are set again to working position, the rotary system of the AVM 1 and the spooling equipment are turned on and the vanishing process continues.

2 Spooling Eqipment FIG. 1B

FIG. 1B shows the ten (10) steps spooling of the cable as it is repaired using commercial spooling equipment 2 connected to the Arc Vanishing Machine 1.

In this splicing method of FIG. 1B, the cable has to be passed several times through the Arc Vanishing Machine (AVM) 1 in order to vanish the arcs 15 resulting from the butt-end welding. The spooling of the cable 10 is a prerequisite for the AVM 1 to operate.

According to the number of former heads 800 (shown and described later in reference to FIGS. 8A–8E in the machine (6, 9, 12) and the number of wires in the outer armor of the cable 10 to be repaired, more or less times will be needed to pass the cable through the machine. (For an 18 outer armor wires cable in a 6 former head machine: 3 passes will be required; in a 9 former head machine: only 2 passes).

The Spooling Equipment 2 allows the cable 10 to move, and (consists of a winch 30 to carry the main traction and an auxiliary reel 35 activated both by a spooling system) connected to the AVM security system (described later in reference to FIG. 18) by means of a pneumatic valve adapted to its transmission.

When the pneumatic valve receives an electric signal from the security system sensor system (described later in reference to FIG. 18) in the AVM 1, cable motion is automatically interrupted.

3 Butt-End Microwelder FIG. 1C

FIG. 1C shows the wire arc 15 conformed to be butt-end welded using a butt-end microwelder 3 and to be vanished using the Arc Vanishing Machine 1 (FIG. 1A).

Butt-end welding consists of fusing two same diameter wires by means of melting together their tip ends by a short cut produced by a low-tension transformer. In this cable splicing method the outer armor wires are butt-end welded with a Butt-End Microwelder 3 such as ones manufactured by August Strecker Microwelder, Auteldra 1/0 or Johnson Metal Company Ltd. Microweld model S.G. Other examples of butt-end welding are described in U.S. Pat. No. 3,259,969 to Tessman; U.S. Pat. No. 3,828,601 to Tessman; U.S. Pat. No. 3,934,784 to Tessman; and U.S. Pat. No. 4,317,003 to Gray, which are all incorporated by reference and referred to in the background section of the subject invention.

In this cable splicing method it is necessary to conform an ARC 15 of certain proportions with the wire ends to be welded. ARC dimensions are established in order to make possible the handling of the Microwelder 3 and therefore the execution of the butt-end welding on wires belonging to a cable armor. ARC dimensions are established to facilitate displacement and subsequent vanishing of each of the arcs 15 by the action of one of the former heads 800 of the AVM 1.

Referring to FIG. 1C, when replacing and distributing the outer armor layer, wire overlaps 16, 18 approx. 40 cm long were left fixed with adhesive tape (not shown) on each side of the "splicing point" 14, this tape is removed. Starting from the "splicing point" 14 and depending on the diameter of the cable 10 being spliced, 4 to 5 steps or "hills" of the wire on the cable are unwound on each side from the helical wrapped outer armor layer. It represents approximately 25 cm in each direction for a total length of approximately 50 cm. The ARC 15 is conformed crossing the unwound wires 16, 18 at 25 cm high over the splicing point 14. Wires 16, 18 are cut at this intersection 19 in square angle. Tip ends are welded according to technical specifications for each type of wire using a butt-end microwelder 3.

4 Postformer FIG. 1D

FIG. 1D shows a cable postforming procedure using a Cable Postformer 4.

In this splicing method the postforming process tests the effectiveness and guarantees the strength of the weldings. It also withdraws stress from the repaired wires. The Postformer 4 is placed on the provided surface of the AVM 1, the Postformer Rack 202. A set of rollers 5 is selected depending on the cable's diameter. The cable 10 is positioned in the axis of the Postformer 4 (and of the AVM indeed) the rollers 5 are adjusted, its intensity graduated about the cable 10 according to individual cable specifications.

DETAILED DESCRIPTION OF A PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

1 Arc Vanishing Machine, AVM FIG. 1E

The Arc Vanishing Machine 1 consists of 4 major groups of components: the support assembly 100 that provides the bearing structure for the other major components. The turrets assembly 600 with the former heads 800 on top where the vanishing of the arcs 15 takes place. The rotary system 1700 that gives the former heads 800 their spinning motion. The electrical system 1800 that controls the spinning motion of the former heads 800 and contains the security system 1600 that may stop the spooling of the cable 10.

The Support Assembly 100 is composed of framework 200, table surface 300, cable guides 400, and transmission shaft hangers 500. It supports the turrets 600 (six for this preferred embodiment) each consisting of bracket 700 with a former head 800 on top of each. Former heads, the cores of the machine are composed of: Die 900, Die Box 1000, Adjusting Nut 1100, Chain Sprocket 1200, Bearing Box 1300, Base Spacer 1400, Former Head Base 1500 and Failure Detection Microswitch 1600. The former heads 800 present a spinning motion originated by the Rotary System 1700 and controlled by the Electric System 1800.

FIG. 1E is a perspective view of the novel electromechanical cable-splicing machine 1 showing its mayor components. In FIG. 1E, 100 refers to the Support Assembly of the Arc Vanishing Machine 1 shown in FIG. 2A. Table framework 200 is shown more in detail in FIGS. 2B–2E, Table Surface in FIGS. 3A–3B, cable guides 400 in FIGS. 4A–4B, transmission shaft hangers 500 in FIGS. 5A–5C. In FIG. 1E, 600 refers to the turrets shown in FIGS. 6A–6C. Brackets 700 are shown more in detail in FIGS. 7A–7B. A Former Head 800 is shown in FIGS. 8A–8C. Die 900 is shown more in detail in FIGS. 9A–9B, Shaft Die Box 1000 in FIG. 10, Adjusting Nut 1100 in FIG. 11 and Chain Sprocket in FIG. 12. Bearing Box 1300 is shown more in detail in FIGS. 13A–13B, Base Spacer 1400 in FIG. 14, Former Head 1500 in FIGS. 15A–15D and Microswitch 1600 in FIGS. 16A–16B. In FIG. 1E 1700 refers to the Rotary System shown in FIG. 17 and 1800 to the Electric System shown in FIG. 18.

100 Support Assembly FIG. 2A

Support assembly 100 of the machine 1, whose major components are shown in FIG. 2A, consists of a framework 200 (table structure 201, postformer rack 202, electric motor support 203) that holds the table surface 300 where are fixed the turrets 600, the electric motor, pulleys assembly and transmission shaft of the rotary system 1700, and the control panel and cables of the electric system 1800.

On the turrets table surface 300, at the front and rear end of the Arc Vanishing Machine 1, are fixed the inlet and outlet cable guides 400 which positions the cable 10 to be repaired in the axis of the former heads 800 of the turrets 600 and of the Postformer 3 to be placed at the end of it on the Postformer Rack. Underneath the table, shaft hangers 500 are provided to hang the transmission shaft 1720.

200 Framework FIGS. 2B–2E

Referring to FIGS. 2B–2E, framework 200 is basically a skeleton built from steel angles and a steel plate as a table. These components shown in FIGS. 2B–2E constitute the structure of machine 1 of FIG. 1A. FIG. 2B is a perspective view of the machine 1 showing its support components. FIG. 2C is a top view of the machine 1 of FIG. 2B along arrow A. FIG. 2D is a side view of machine 1 of FIG. 2B along arrow B. FIG. 2E is a front view of the machine 1 of FIG. 2B along arrow C. Referring to FIGS. 2B–2E, components 205, 206 and 207 refers to vertical supports for the invention 1. Longitudinal top supports 215 and longitudinal intermediate supports 220 interconnect the ground-based vertical supports along with intermediate vertical supports 210 and 211, horizontal top and ground based cross-bars 225 and 230. Angled support 250 interconnects vertical supports 235 and dual horizontal (longitudinal and transversal) top supports 240 and 245. Components 235, 240, 245 and 250 (can each be a steel angle having dimensions of approximately 3" wide by approximately ¼" thick) form a rack, to place the postformer 4 FIG. 1D in the axis of the former heads 800. Components 1705, 1706, 1710, 1715 and 1730 of FIG. 2E will be described in more detail in reference to FIG. 17.

300 Turrets Table FIGS. 3A–3D

FIG. 3A is an enlarged view of Table 300 of FIG. 2D around a turret 600. FIG. 3B shows a top view of a turret of FIG. 3A along arrow D1. FIG. 3C is a top view of FIG. 3A along arrow D2. FIG. 3D is a top view along arrow D3.

Figure 6B:
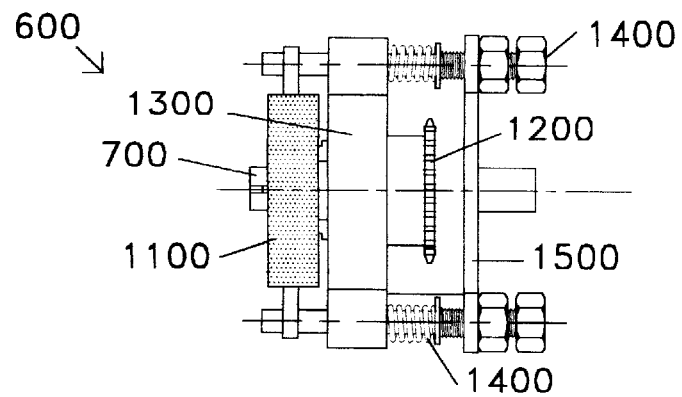
FIG. 6B is a top view of the turret 600 of FIG. 6A along arrow H.
Figure 6C:
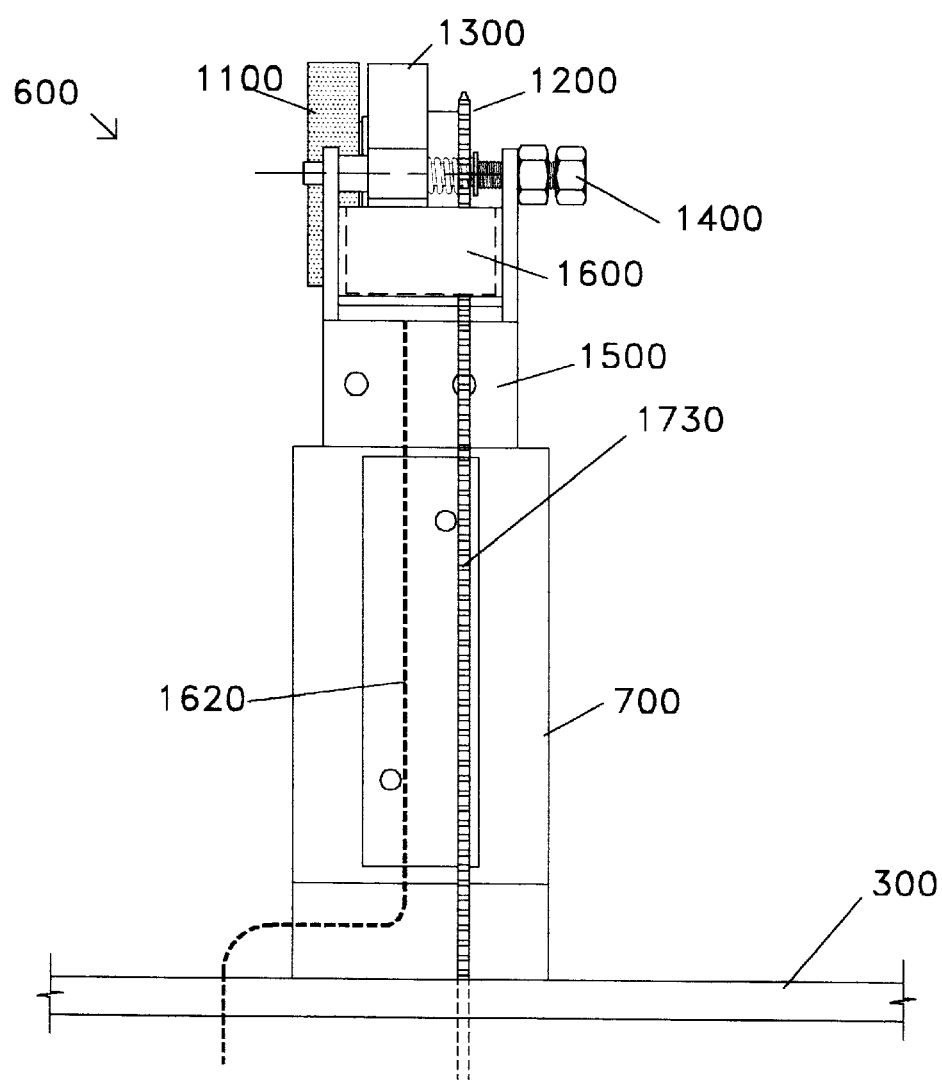
FIG. 6C is a side view of the turret 600 of FIG. 6A along arrow I.

On top of the table structure 201 (FIG. 2A), the Turrets Table 300 provides by means of a longitudinal steel plate approximately ¼" thick 305, the surface for placing the turrets 600 and for hanging the transmission shaft 1720 (by means of the hangers 500) and the microswitch cables 1620 (by means of the cable grid 320). On this surface slots 315 and 316 (FIGS. 3A, 3C) are provided to allow roller chain 1730 to be installed on the transmission shaft sprocket 1725 (below the table) and the former head sprocket 1200 (FIGS. 6A–6C on top of the turret). Slots 310 are provided to allow the pass of former head microswitch cables 1620 to underneath the table. The cable grid 320 runs along the bottom of the steel plate 305 and carries the former head microswitch cables 1620 to the control panel 1805. A clearance for pulley 325 (FIG. 2B) is provided where the upper pulley 1710 (FIGS. 2E, 17) of the rotary system passes steel plate 305 level. Through holes 330, 331 (FIG. 3D) are provided for fixing the transmission shaft hangers 500.

400 Cable Guide Assembly FIGS. 4A–4B

At the entry and leaving of the Arc Vanishing Machine 1, fixed to the front and rear end of the table 300 are the components of the cable guide assembly 400 shown in FIG. 2A.

Referring to FIGS. 2B–2D, inlet guiding pulley guide 405 and outlet guiding pulley guide 406 align the cable 10 along the axis of the former heads 800 and maintain his alignment and height of cable 10 entering and leaving the Arc Vanishing Machine 1. Components 405 and 406 are shown in detail in reference to FIGS. 4A–4B. Pulley guides 405, 406 have identical components and will be described as shown by FIG. 4B.

FIG. 4A is an enlarged view of the cable guide 405. FIG. 4B is a side view of edge components 405 and 406 along arrow E of FIG. 4A showing the height of cable 10 being maintained since its entry in the machine through the former heads until its leaving and before the Postformer 4.

Referring to FIGS. 4A–4B, component 405, 406 refers to a steel guide, approximately 3"×¼" 410. 411 refers to a pulley. 415, 416 refers to nuts, each approximately ½" in size. 420, 421 refers to grease cups. 425, 426 refers to washers approximately ⅝" in size. 430, 431 refers to bolts approximately ⅝" in size machined to approximately ½" and drilled for lubrication of the pulley 410, 411.

500 Transmission Shaft Hanger FIGS. 5A–5B

Hangers 500 shown in FIGS. 2D, 3A and 3D function as a support for the transmission shaft 1720 which runs along the axis of the turrets 600 (FIG. 1E) below the table surface 300 (FIG. 2A) of the Arc Vanishing Machine 1 (FIG. 1A). FIG. 5A is a front view of a hanger 500 of FIGS. 3A and 3D. FIG. 5B is a side cross-sectional view of the hanger 500 of FIG. 5A along arrow F. FIG. 5C is a top view of the hanger 500 of FIG. 5A along arrow G.

Referring to FIGS. 5A–5C, the hanger fixing plate 505 is a steel plate approximately ¼" thick. Through-holes 510, 511 are used to fasten the hanger 500 to the table 300 of the machine 1. Component 515, 516 refer to longitudinal weldings that fasten the fixing plate 505 to a steel tube (or drilled steel round bar) 520. A brass bushing 525 is used to reduce the friction between the steel tube and the transmission shaft 1720. A threaded hole 530 and a grease cup 535 are provided for lubrication of the inner walls of the hanger 500.

600 Turrets Assembly FIGS. 6A–6C

The Turrets Assembly 600 placed on the table surface 300, consist of a set of Turrets (6 for this preferred embodiment (shown in FIG. 1E)) each composed of a column/bracket 700 with a former head 800 on top. FIG. 6A is a perspective view of a turret 600 of FIG. 1E. FIG. 6B is a top view of the turret 600 of FIG. 6A along arrow H. FIG. 2C is a side view of the turret 600 of FIG. 6A along arrow I.

Referring to FIGS. 6A–6C, turret 600 is composed of a bracket 700 supporting and maintaining at an adequate height from the table the former head 800, which is composed of Die 900, Die Box 1000, Adjusting Nut 1100, Chain Sprocket 1200, Bearing Box 1300, Base Spacers 1400, Former Head Base 1600 and Failure Detection Microswitch 1600.

Figures 7A, 7B:
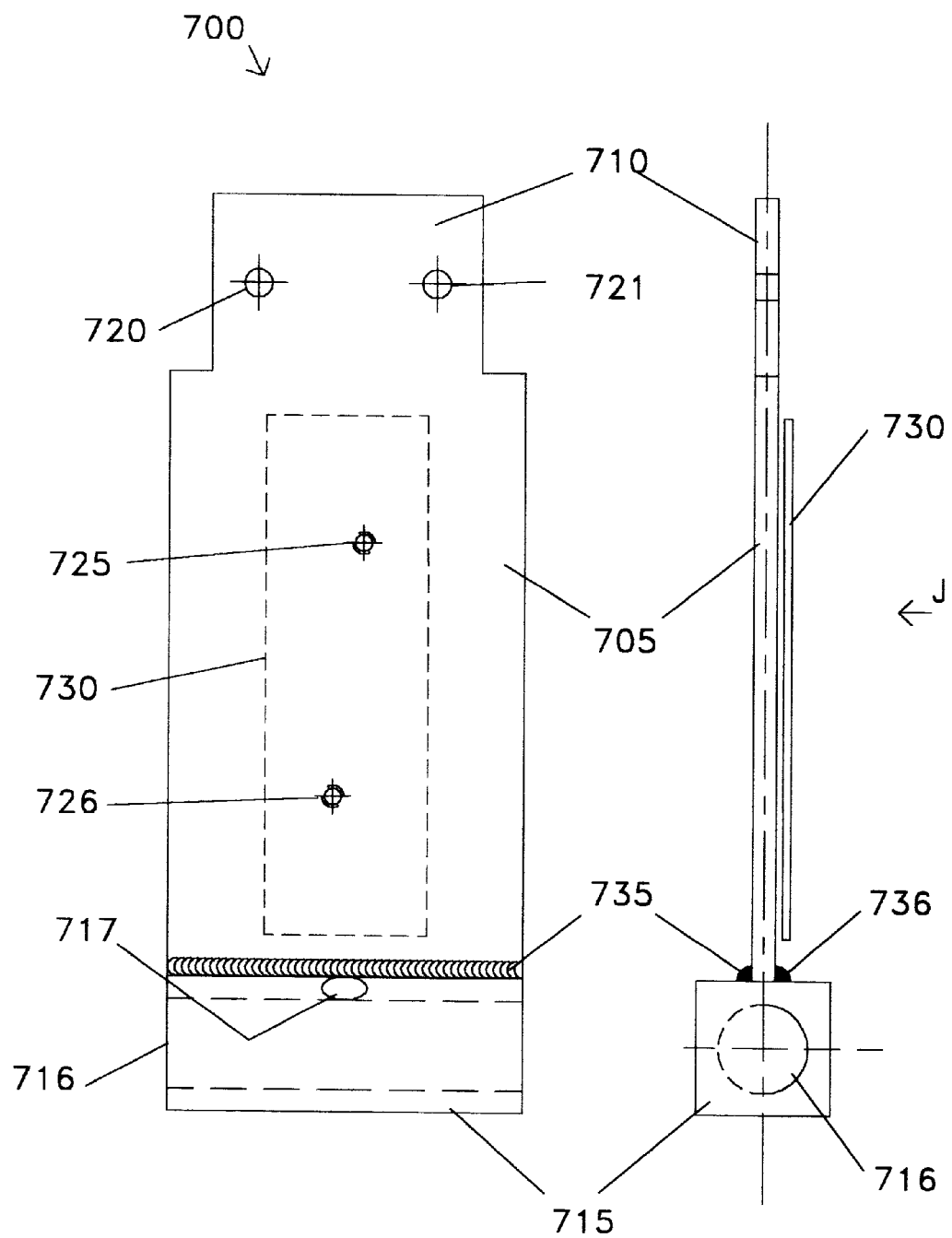
FIG. 7A is a front view of the bracket 700 of FIG. 6A along arrow I.
FIG. 7B is a side view of the bracket 700 of FIG. 7A along arrow J.
Figure 8A:
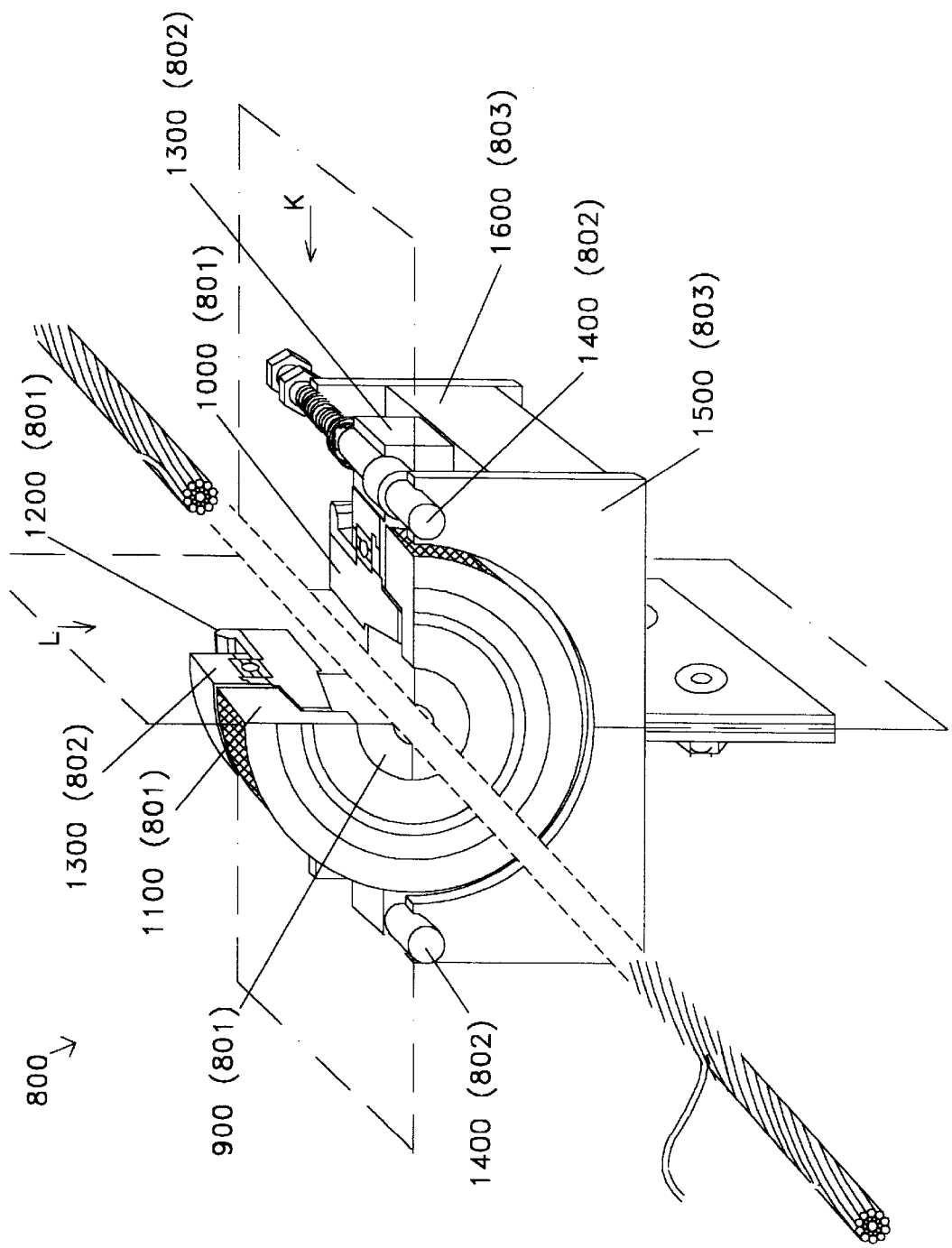
FIG. 8A is a perspective view of the former head 800 of the turret 600 of FIG. 6A.
Figure 8B:
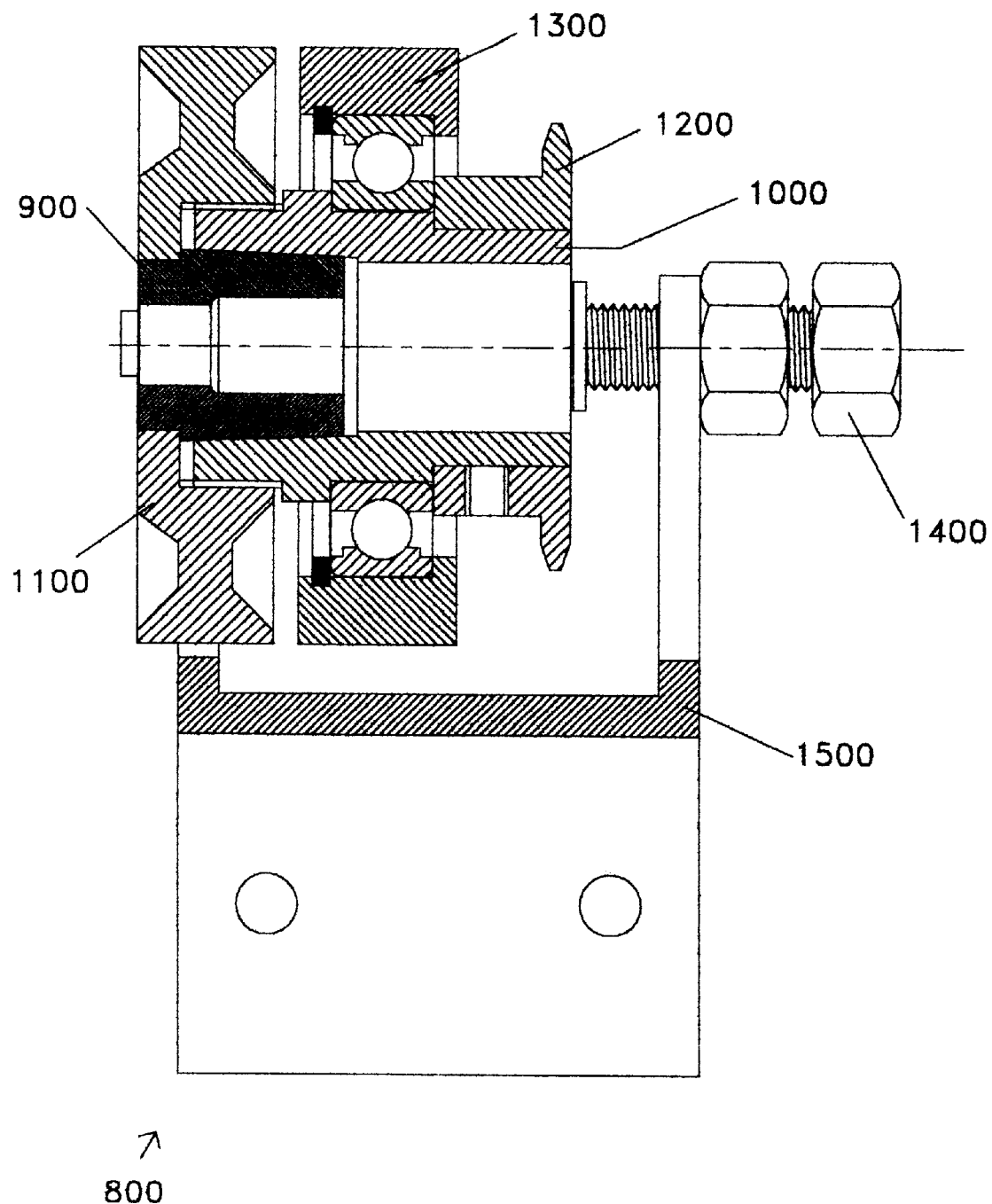
FIG. 8B is a cross-sectional view of the former head 800 of FIG. 8A along arrow K.
Figure 8C:
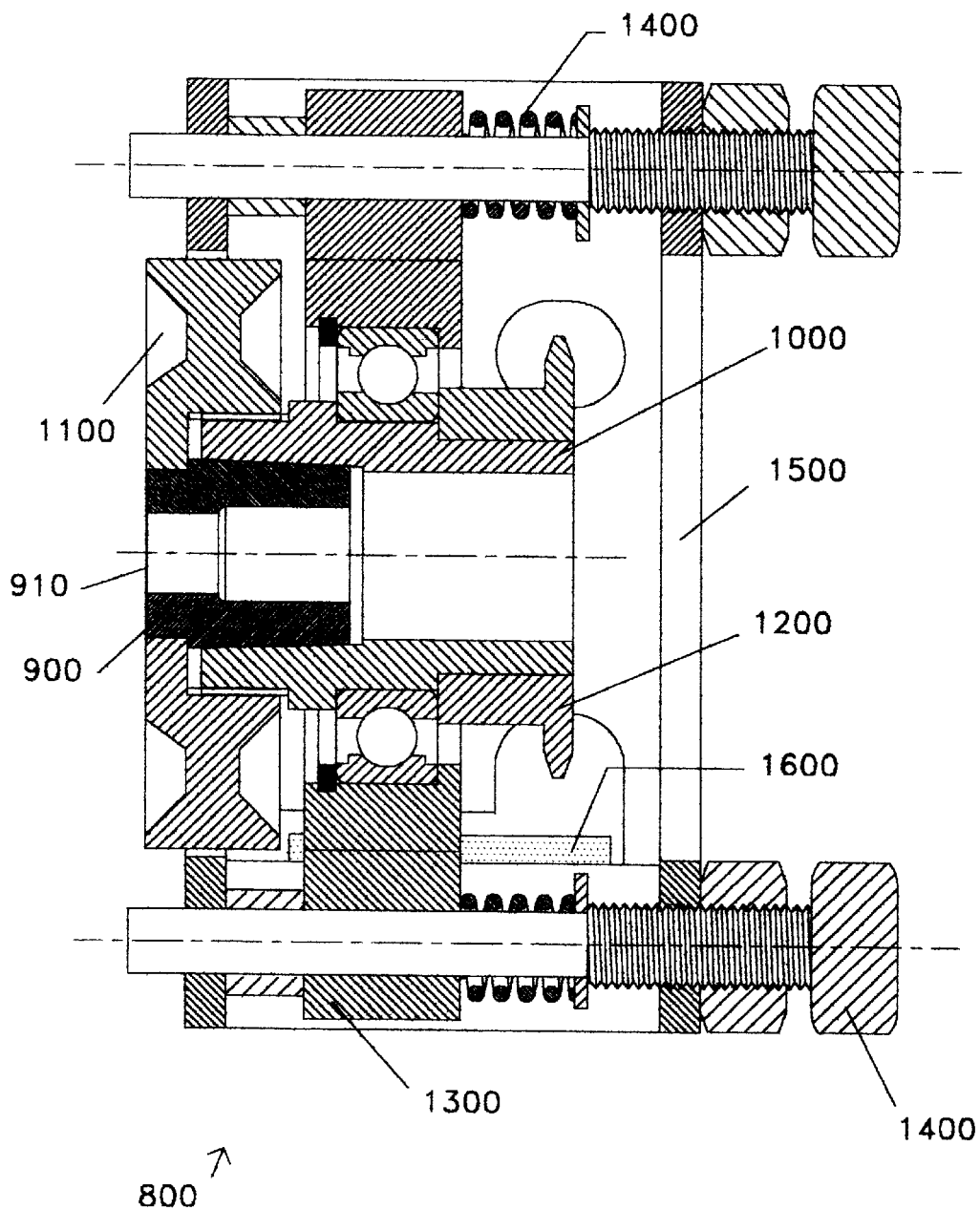
FIG. 8C is a cross-sectional view of the former head 800 of FIG. 8A along arrow L.
Figure 8D:
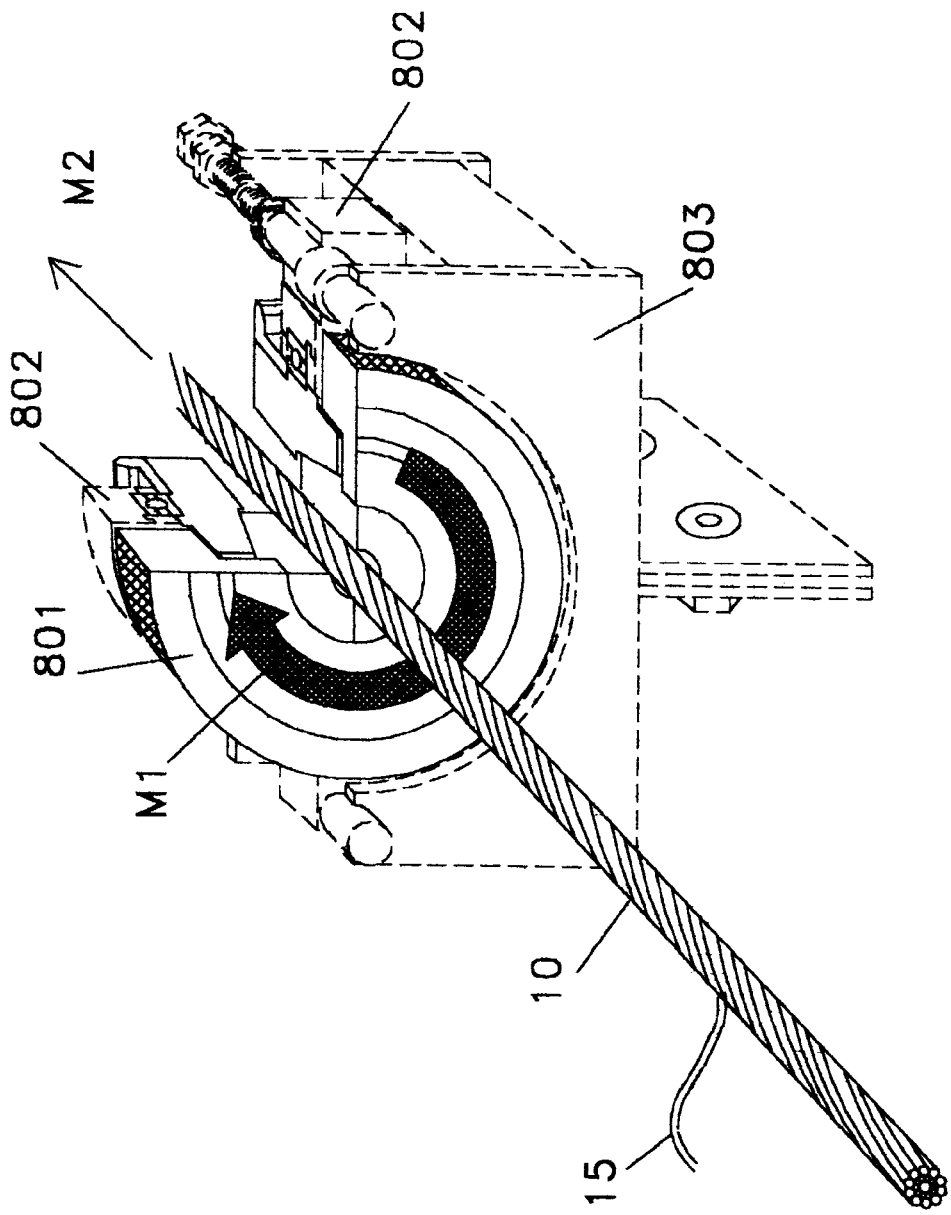
FIG. 8D is a perspective view of the unassembled former head 800 of FIGS. 8A–8C showing its movements.

700 Bracket FIGS. 7A–7B

Brackets 700, one for each turret 600, support and maintain at an adequate height from the table 300 the former heads 800 (FIG. 6C). FIG. 7A is a front view of a bracket 700 of FIG. 6A. FIG. 7B is a side view of the bracket 700 of FIG. 7A along arrow J. Referring to FIGS. 7A–7B, bracket body 705 and bracket top 710 each refer to steel plates of approximately ¼" thick, 720 and 721 refer to two holes of approximately 5/16" in size and two screws with nuts approximately ¼" in size for fastening the former head base 800. Components 725 and 726 each refer to threaded holes of approximately ¼" diameter in size for fastening a steel plate 730 approximately ⅛" thick, the microswitch cables protection plate 730. Component 715 refers to a steel square bar, approximately 1½" in size with a hole-through 716 approximately 1" diameter, welded to the bracket body 705 by two longitudinal weldings 735 and 766.

800 Former Head FIGS. 8A–8E

Referring to FIGS. 8A–8E, each former head 800 consists of a spinning assembly 801 (900, 1000, 1110, 1200) connected to a fix assembly 803 (1500, 1600) by means of a mobile assembly 802 (1300, 1400). The spinning assembly 801 is conformed of Die 900, Die Box 1000, Adjusting Nut 1100, and Chain Sprocket 1200. This spinning assembly 801 is housed by the Bearing Box 1300, which provides the transition surface between the spinning and non-spinning elements. By means of the Base Spacer 1400 the bearing box 1300 and the components it houses become a mobile assembly 802 able to move back and forward on the base 1500. This former head base 1500 and the failure detection microswitch 1600 it houses constitute the fix assembly 803 of the former head.

The spinning assembly 801 performs the main function of the machine: accommodating on the helical wire path the arc 15 that appeared on the cable outer armor wire 10 because of its resplicing using a butt-end welding method until its vanishing at the end of the cable. This work is accomplished in the following steps:

(i) The movement of roller chain 1730 (FIGS. 2E, 3A), and transmission shaft 1720 (FIG. 3A) below the table of the machine, is received by chain sprocket 1200 and transformed into turning motion;

(ii) This turning movement is transmitted to die-box 1000 (which is supported by bearing box 1300 and its ball bearing 1310 (FIGS. 10, 13A–13B)) and to die 900 housed into it and locked in place by adjusting nut 1100;

(iii) The turning movement of die 900 in the direction of arrow Ml (FIG. 8D) combined with the friction it applies on the wire arc while the cable 10 passes through the die hole 910 by action of the spooling equipment 2 in the direction of arrow M2, makes the wire to accommodate in place following the helical pattern of the cable armor and makes the arc 15 to displace towards the end of the cable 10 until its complete vanishing at its tip end not shown).

Figure 12:
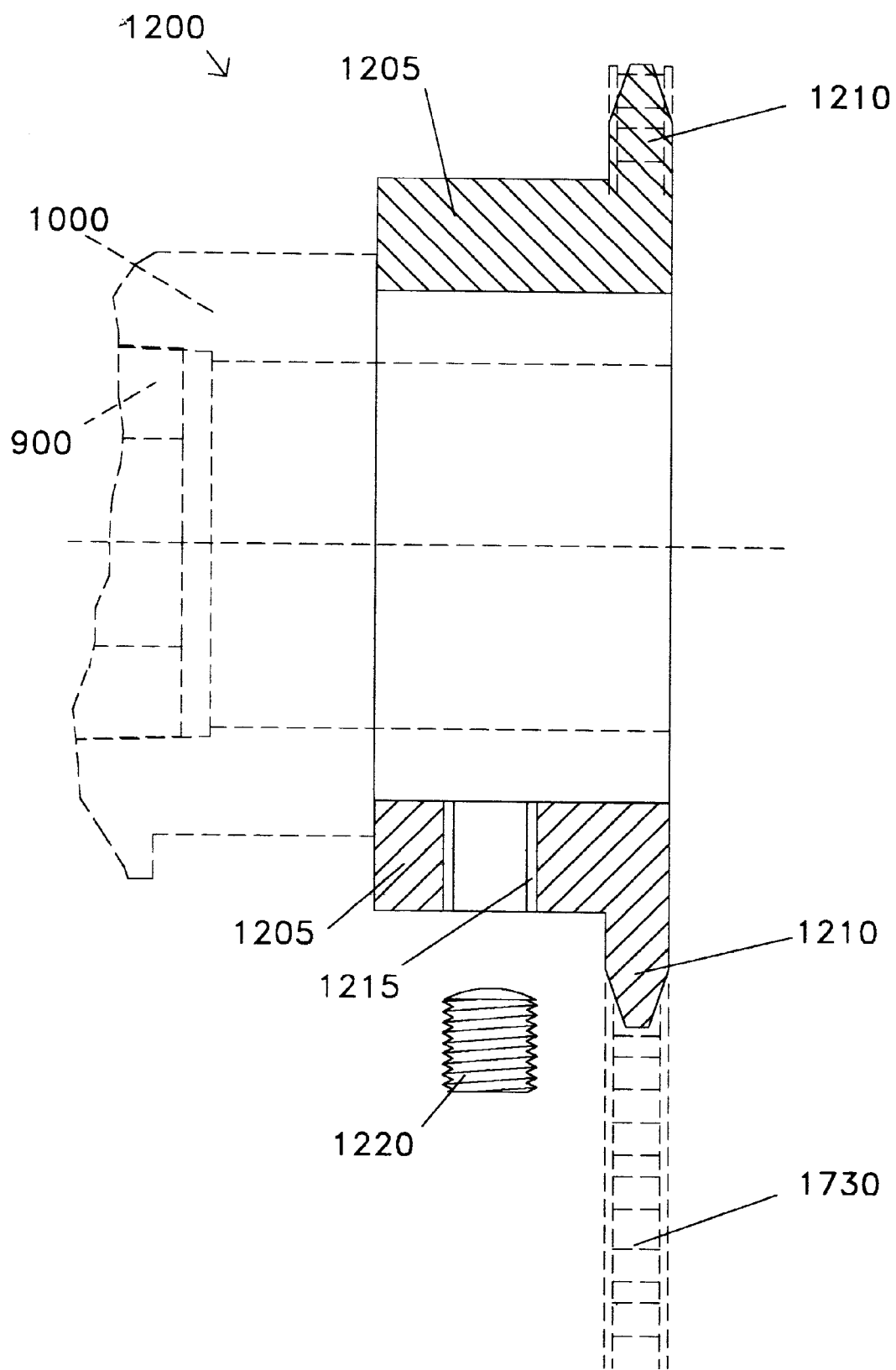
FIG. 12 is a cross-sectional view of the former head chain sprocket 1200 of FIG. 8A.
Figure 13:
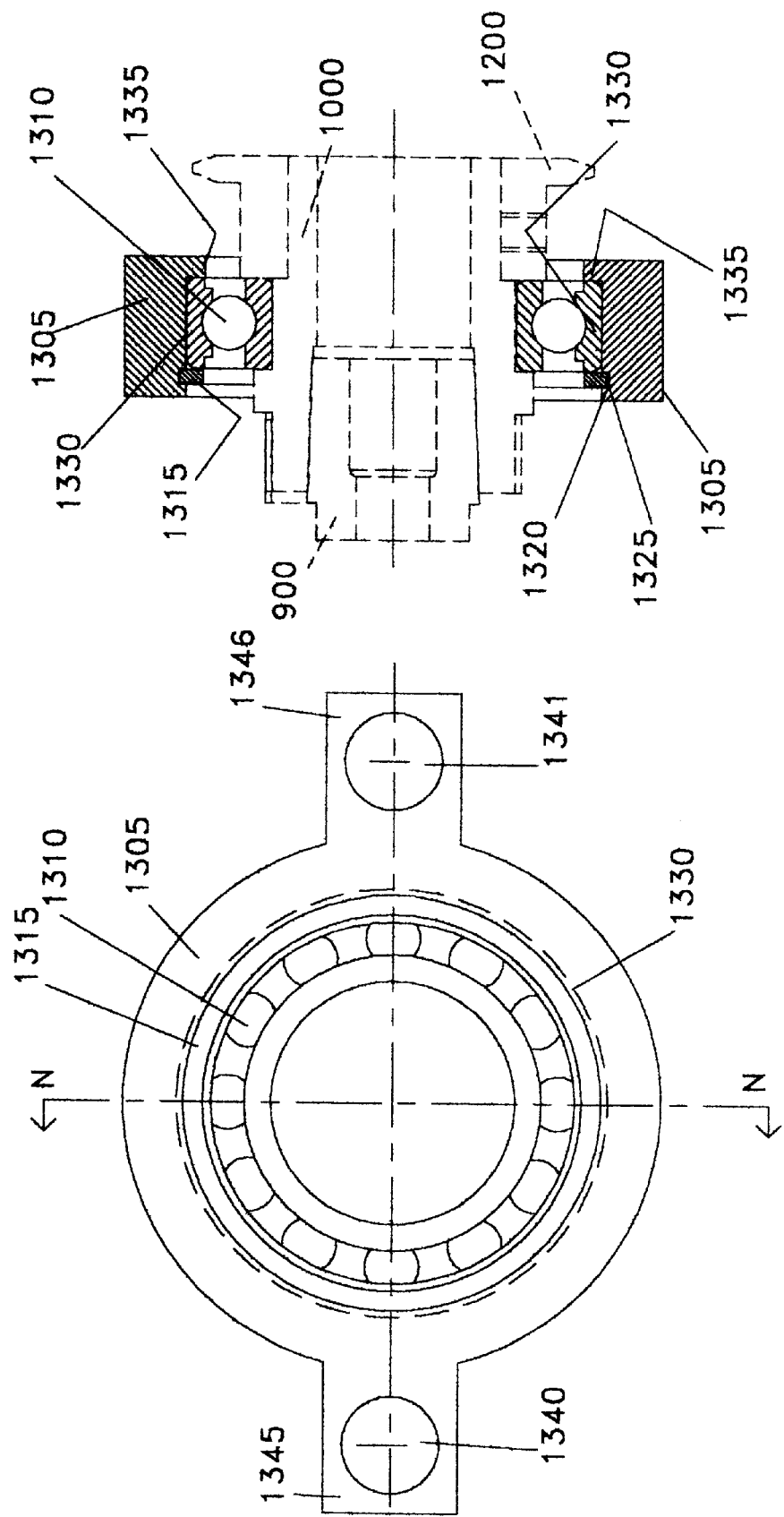
FIG. 13A is an end view of the bearing box 1300 of FIG. 8A.
FIG. 13B is a cross-sectional view of the bearing box 1300 of FIG. 13A along arrow N.

Referring to FIGS. 8A–8E, chain Sprocket 1200 is fixed to Die Box 1000 by a set-screw 1220 (FIG. 12). Die 900 is pressed into Die Box 1000 and fixed there by the Adjusting Nut 1100. Adjusting Nut 1100 is fixed to Die Box by a left-hand thread. These four elements rotate by the action of the roller chain 1730 (FIG. 3A) on the chain sprocket 1200 that converts chain motion into turning movement Ml (FIG. 8D).

Bearing Box 1300, which is placed between Die Box 1000 and Chain Sprocket 1200 provides in its Ball Bearing 1310 (FIG. 13) the transition surface between the spinning assembly 801 and the rest of the components of the former head 800. Bearing box 1300 housing spinning assembly 801, and base spacers 1400 that set it on the former head base 1500, conform the mobile assembly 802. The mobile assembly 802 presents a longitudinal movement towards the back of the former head base 800 when pushed by a cable jam.

Spring 1415 (FIGS. 14, 16) of the base spacer 1400 is used to absorb shocks produced by longitudinal movement of the cable 10 moving in the direction of M2 (FIG. 8D). Whenever the spring 1415 resistance is surpassed, mobile assembly 802 moves forward in the direction of M3. Flange end 1346 (FIG. 14) of the bearing box 1300 touches the microswitch interrupter 1610 (FIG. 14) and activates the failure detection microswitch 1600 located on the former head base 1500. These two last components conform the fix assembly 803 of the former head 800.

Figure 8E:
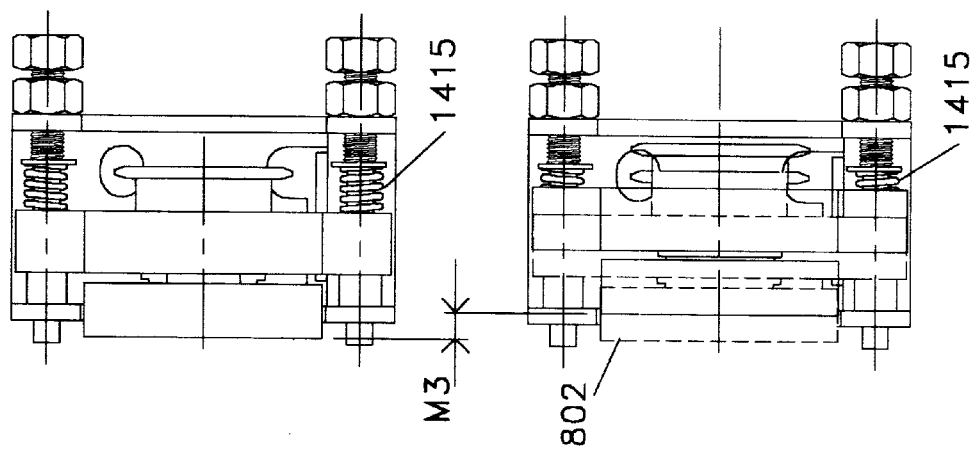
FIG. 8E is a top view of FIG. 8D showing the spring-based movment of the mobile assembly of FIG. 8D.

FIG. 8A is a perspective view of Former Head 800 of FIG. 6A. FIG. 8B is a cross-sectional view of Former Head 800 of FIG. 8A along arrow K, FIG. 8C is a cross-sectional view of Former Head 800 of FIG. 8A along arrow L. Referring to FIGS. 8A–8C, former head 800 includes die 900 (shown in FIGS. 9A 9B), shaft/die box 1000 (shown in FIG. 10), adjusting nut 1100 (shown in FIG. 11), chain sprocket 1200 (shown in FIG. 12), bearing box 1300 (shown in FIGS. 13A–13B), base spacer 1400 (shown in FIG. 14). Former Head Base 1500 (shown in FIGS. 15A–15D), failure detection microswitch 1600 (shown in FIGS. 16A–16B). FIG. 8D is a perspective view of a cable passing through Former Head 800 indicating the movements involved M1 and M2. FIG. 8E is a top view of FIG. 8D showing the spring-based movement of the mobile assembly 802 of head 800.

900 Die FIGS. 9A–9B

Die 900 is fabricated in two halves 905, to facilitate maintenance and operation (removal and exchange). Die 900 is the sole surface in contact with the cable 10. Since die 900 works against high friction, it has to be made of a hard material such as but not limited Keewatin and the like.

FIG. 9A is an end view of a die 900 of FIG. 8A. FIG. 9B is a cross-sectional view of the die 900 of FIG. 9A taken along arrow M. The components of FIGS. 9A–9B will now be described. Component 905 refers to each of two halves of die 900, component 910 refers to the central die hole for cable pass, component 915 refers to the free front surface of the die, component 920 refers to the difference between front and rear end die diameters, which is a clearance for cable way out, component 925 refers to the conical external die surface in contact with the internal die box surface 1010.

1000 Die Box FIG. 10

FIG. 10 is a cross-sectional view of die box 1000 of FIG. 8A. Die box 1000, shown in FIG. 8A has a double purpose that accommodates the die 900 into its conical front portion 1005 and becomes a shaft for the chain sprocket 1200 in its rear portion 1010. Its hole 1015 allows the pass of the cable 10. Left hand thread 1025 on the exterior surface of the conical portion 1005 is used for fixing the adjusting nut 1100 and therefore pressing the die 900 against the die box internal conical bearing and 1035 the contact surface for the ball bearing turning face 1310.

Figure 11:
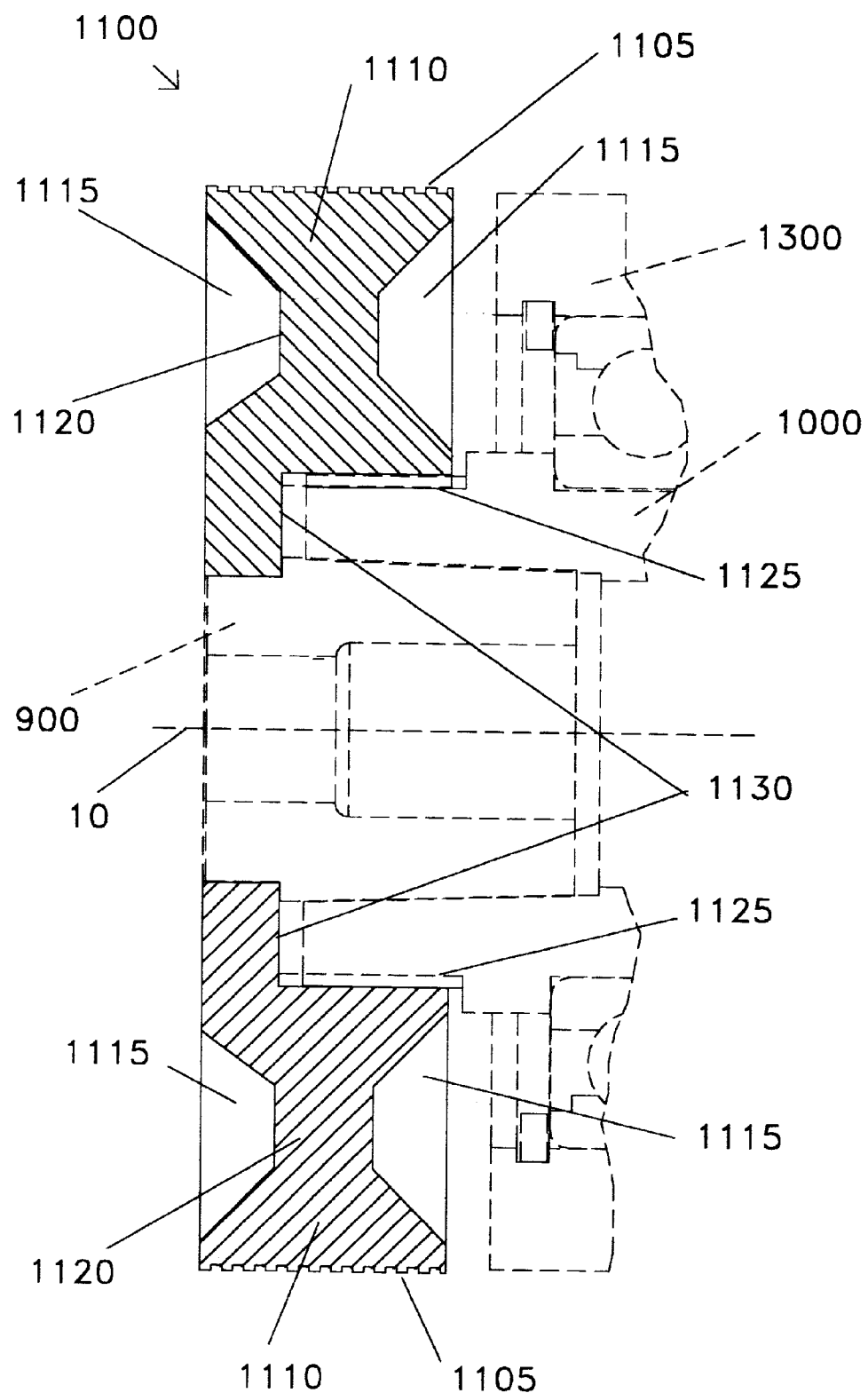
FIG. 11 is a cross-sectional view of the adjusting nut 1100 of FIG. 8A.

1100 Adjusting Nut FIG. 11

FIG. 11 is a cross-sectional view of adjusting nut 1100 of FIG. 8A. Referring to FIG. 11, rough surface 1105 is provided to avoid gliding while turning the adjusting nut 1100. Component 1115 refers to a carved surface on the adjusting nut body 1110 to reduce its weight. Component 1120 refers to the center body of the adjusting nut 1100. Left-hand thread 1125 provides the adjusting surface for Die Box 1000. This left-hand thread works to counteract the right-hand cable plaited and avoid adjusting nut 1100 to unlock and therefore to loosen die 900 by the action of the turning motion of the die 900 (indeed left-hand thread keeps this nut 1100 adjusted by the turning motion of the die 900). Component 1130 refers to the butt surface for the die 900.

In operation, the adjusting nut 1100 allows handy turn and lock of the die 900, which sets the cable 10 in place and the Arc Vanishing Machine 1 in working position.

1200 Chain Sprocket FIG. 12

FIG. 12 is a cross-sectional view of chain sprocket 1200 of FIG. 8A. Referring to FIG. 12 the body of the sprocket 1205 has exterior teeth 1210 and a threaded side hole 1215 for a set-screw 1220 which fixes the Chain sprocket 1200 to the Shaft/Die box 1000. Chain sprocket 1200 has the mission of receiving the roller chain 1730 motion and converting it into turning movement, which drags the shaft/die box 1000 and consequently the Die 900 fixed into it.

1300 Bearing Box FIGS. 13A–13B

The bearing box 1300 of FIGS. 13A–13B is the housing for the heart of the Arc Vanishing Machine, the spinning assembly 801 shown in FIGS. 8A–8D. Bearing Box 1300 accommodates the ball bearing 1310 and retaining ring 1315. FIG. 13A is a front view of bearing box 1300 of FIG. 8A. FIG. 13B is a cross-sectional view of the bearing box of FIG. 13A taken along arrow N.

Referring to FIGS. 13A–13B, component 1305 provides the body of the bearing box 1300 and the free surface to place the ball bearing 1310 which provides the transition surface between the spinning components and the non-spinning ones. Retaining ring 1315 allows to fix the ball bearing 1310 in place, component 1320 provides the butt surface for the retaining ring 1315 and component 1325 provides the groove for the retaining ring 1315. Component 1330 provides the adjusting, internal surface for the ball bearing 1310, component 1335 refers to the butt surface for the ball bearing 1310. Through holes 1340 and 1341 in flange ends 1345 and 1346 are used to fasten the bearing box 1300 and the components it houses to the former head base 1500 by means of the base spacers 1400 (FIG. 8A).

1400 Base Spacer FIG. 14

Two base spacers 1400 fasten the bearing box 1300 and the spinning assembly 801 (FIG. 8A) it houses (die 900, shaft/die box 1000, adjusting nut 1100, chain sprocket 1200) to the former head base 1500. Base spacers 1400 also provide a shock absorber for the cable longitudinal motion which pushes the mobile assembly 802 toward the rear of the base 1500 by means of its springs 1415 which dissipates most of these forces. When the resistance of the springs 1415 is surpassed by the friction of the cable the mobile assembly 802 moves forward and its bearing box flange end 1346 touches the microswitch interrupter 1610 and activates the failure detection microswitch 1600. The tighter the springs 1415 are adjusted by the nuts 1425, the greater resistance this mobile assembly 802 presents to be pushed. A larger diameter cable will need more pressure on the springs 1415 to avoid the friction of the cable to push the mobile assembly 802 forward and as a result to activate the security sensor 1815 of the control panel 1805 (both shown in FIG. 18).

FIG. 14 is a side view of a base spacer 1400 of FIG. 8A. Referring to FIG. 14, 1405 refers to a bolt, approximately ½" in size, machined to approximately ⅜", 1410 refers to a spacer (its a brass tube), 1415 refers to a spring, 1420 refers to a washer approximately ½" in size and 1425 refers to a nut.

The machined bolt 1405 having the nut 1425 set on it, is passed through the threaded hole 1520 on back plate of former head base 1500; washer 1420 and spring 1415 are positioned on the bolt 1405; bolt is passed through the bearing box flange end 1346; the spacer 1410 is placed and the bolt is passed through the flat hole 1510 on the front plate of the former head base 1500; finally by adjusting the bolt 1405 and the nut 1425, the mobile assembly 802 is fastened to the fix assembly 803 of the former head 800.

1500 Former Head Base FIGS. 15A–15D

FIG. 15A is a perspective view of former head base 1500 of FIG. 8A. FIG. 15B is a side view of the former head base 1500 of FIG. 15A along arrow O of FIG. 15A. FIG. 15C is a front view of the former head base 1500 of FIG. 15B along arrow P. FIG. 15D is a top view of the head base 1500 of FIG. 15B along arrow Q.

Referring to FIGS. 15A–15D, component 1505 is the front steel plate, 1506 is the limit of its surface, 1510 and 1511 are flat holes approximately ⅜" diameter on front plate. Component 1515 is the back steel plate, 1516 is the limit of its surface, 1520 and 1521 are threaded holes approximately ½" diameter on back plate. Component 1525 is the bottom steel plate, 1526 is the limit of its surface, 1530 and 1531 refers to slots on bottom steel plate for roller chain pass. Components 1535 and 1536 are the microswitch plates, 1540 is the hole for microswitch interrupter. Components 1545 and 1550 are the base fixing plates, 1546 and 1547, 1551 and 1552 are the base fixing holes that set the former head base on top of the turret bracket 700. All these components refer to steel plates approximately ¼" thick.

Also the flat holes 1510 and 1511 and threaded holes 1520 and 1521 by means of the base spacers 1400 that traverse them, serve to fasten to the fix assembly 803 (conformed of former head base 1500 and microswitch 1600) the mobile assembly 802 of the former head 800.

1600 Failure Detection Microswitch FIGS. 16

FIG. 16 is a cross-sectional view of the former head 800 of FIG. 8A through the base spacer vertical axis showing the failure detection microswitch 1600 located on the former head base 1500. It consists of a commercial microswitch 1610, such as the micro interrupters 090 manufactured by Gedisa General Distributor, fixed to the microswitch plate 1536 by means of the microswitch-fixing nut 1615. When microswitch interrupter 1610 on top of the microswitch box 1605 is activated by the pressure of the bearing box 1300, it sends a signal through the microswitch cables 1620 to the electric sensor 1815 of the electric system control panel 1805 (FIG. 18). It has the purpose of detecting when a jam occurs in the former head 800 and sending the signal to generate the immediate stop of the rotation of the rotary system 1700 of the spinning assembly 801 (FIG. 8D) and of the rewinding of the cable 10 by the spooling equipment 4. This is a security system for preventing cable rip in case the cable cannot follow its way through the turrets system 600 because of a wire jam.

1700 Rotary System FIG. 17

FIG. 17 shows a schematic diagram of the rotary system 1700 of the AVM 1.

The rotary system 1700 of the AVM generates and transmits to the spinning assemblies 801 (FIG. 8A) of the former heads 800 a turning motion that combined with other factors will cause the wire to accommodate in place following the helix pattern of the cable 10 outer armor and the arc 15 that resulted from the butt-end welding to displace towards the end of the cable until its complete vanishing at the tip end.

Electric motor 1705 having a protective guard 1706 connects to pulley 1711. Transmission belt 1715 connects pulley 1711 to pulley 1710, which connects to transmission shaft 1720 (FIG. 3A). It is fixed to the bottom of table surface 300 by means of the transmission shaft hangers 500. On the transmission shaft sprockets 1725 are positioned underneath each turret 600 (FIG. 1E). Roller chain 1730 connecting shaft sprocket 1725 and former head sprocket 1200 (FIG. 3A) is used to convert and transmit turning motion from the transmission shaft 1720 below the table to the spinning assembly 801 (FIG. 3A) of the former head 800 on top of the turret 600. The electric motor 1705 is turned on and off from the control panel 1805 (FIG. 18) of the electric assembly 1800 by means of the electric motor connection 1825.

1800 Electric System FIG. 18

FIG. 18 shows a schematic diagram of the electric system 1800 of the AVM 1

The electrical system 1800 consists of a control panel 1805 with outlets for 120-volt power supply 1820, electric motor connection 1825 and spooling connection 1830. This last connection ends in a pneumatic valve 1831 adapted to connect to the transmission of the spooling equipment 2. When activated by the security sensor 1815 the pneumatic valve 1831 sets the spooling equipment transmission to neutral position interrupting the rewinding of the cable 10 by the spooling equipment 2.

Control panel 1805 has the power supply switch 1810 to turn the rotary system 1700 on and off; the security electrical sensor 1815 to turn automatically off the spinning system 1700 and to stop the rewinding of the spooling equipment 2 when activated by the former head failure detection microswitch 1600.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of repairing helically wrapped outer cable wires of an electromechanical cable without using a brazed splice or a shimmed splice, comprising the steps of:

(a) overlapping ends of previously cut helically wrapped outer cable wires of the cable together to form individual loose arc portions in the helically wrapped outer cable wires, each of the loose arc portions being raised above the cable and are spaced apart from one another to form spaced apart points;

(b) welding the ends in each of the raised arc portions together without using a brazed splice or a shimmed splice; and (c) flattening each of the raised arc portions in the hellically wrapped outer cable wires until each of the individual raised arc portions are removed, wherein the helically wrapped outer cable wires are repaired without using a brazed splice nor a shimmed splice.

2. The method of repairing the breakdown in the cable of claim 1, further comprising the step of:

(c) postforming the cable to remove stress and test the effectiveness of the welding of the outer wires.

3. The method of repairing of claim 1, wherein the welding of step (b) includes:

butt-end welding each of the previously cut outer cable wires.

4. The method of repairing of claim 1, wherein the overlapping step includes:

producing an excess length over several centimeters of lapping wire ends.

5. The method of repairing of claim 1, wherein the spaced apart points includes:

longitudinally spacing apart each of the raised loose arc portions from one another along the axis of the cable wrapped outer armor wires.

6. The method of repairing of claim 5, wherein the step (c) includes:

passing each of the raised arc portions through a restrictive opening that causes the arc portion to flatten and pass to an end of the cable.

7. The method of repairing of claim 1, further comprising the step of:

(i) continuing steps (a), (b), and (c) for additional arc portions; and (ii) sensing a jam from the displacing step and stopping the continuing of the flattening step upon occurrence of the jam and before a breakage in the cable.

8. A method of butt end welding helically wrapped outer armor wires in an electromechanical cable that has been repaired for having a short without using a brazed splice nor a shimmed splice, comprising the steps of:

locating a short within an internal conductor in an electromechanical cable having an outer helically wrapped layer of armor wires;

cutting the armor wires in the outer helically wrapped layer of the cable to reach the short in the internal conductor;

repairing the short in the internal conductor;

butt end welding exposed ends of the cut armor wires together to form individual loose arcs in the helically wrapped layer of the armor wires, the loose arcs being raised above the cable; and flattening each of the individual loose arcs in the helically wrapped layer of armor wires so that each of the individual loose arcs are removed, wherein the helically wrapped outer armor wires are repaired without using a brazed splice nor a shimmed splice.

9. The method of butt end welding helically wrapped outer armor wires of claim 8, further comprising the step of:

postforming the cable to remove stress and test the effectiveness of the welding of the helically wrapped layer of the armor wires.

10. The method of butt end welding helically wrapped outer armor wires of claim 8, further comprising the step of:

sensing a jam from the flattening step and stopping the flattening step upon the occurrence of the jam and before a breakage in the cable.

11. The method of butt end welding helically wrapped outer armor wires of claim 8, wherein the welding step includes:

longitudinally spacing slicing points of the cut outer armor wires from one another along the axis of the cable.

12. The method of butt end welding helically wrapped outer armor wires of claim 8, wherein the butt end welding step includes:

producing in each of the cut armor wires to be repaired an excess that allows the overlapping of the exposed ends to be joined.

13. A method of repairing helically wrapped outer cable wires of an electromechanical cable without using a brazed splice or a shimmed splice, comprising the steps of:

(a) overlapping ends of a previously cut helically wrapped outer cable wires of the cable together to form individual loose arc portions in the helically wrapped outer cable wires, each of the loose arc portions being raised above the cable and longitudinally spaced apart from one another to form longitudinally spaced apart points;

(b) butt-end welding each of the spaced apart points of raised arc portions together without using a brazed splice or a shimmed splice; and (c) flattening each of the raised arc portions in the helically wrapped outer cable wires until each of the individual raised arc portions is dispersed within the cable, wherein the helically wrapped outer cable wires are repaired without using a brazed splice nor a shimmed splice.

* * * * *